(12) United States Patent
Gillis et al.

(10) Patent No.: US 8,408,968 B2
(45) Date of Patent: Apr. 2, 2013

(54) DEVICES, SYSTEMS, AND METHODS FOR RECOVERY AND RECYCLING OF CARPET COMPONENTS

(75) Inventors: Terrence Edward Gillis, Tacoma, WA (US); James Lawerence Evans, Puyallup, WA (US)

(73) Assignee: Carpet Processing & Recycling, LLC, Tacoma, WA (US)

( * ) Notice: Subject to any disclaimer, the term of this patent is extended or adjusted under 35 U.S.C. 154(b) by 25 days.

(21) Appl. No.: 13/324,798

(22) Filed: Dec. 13, 2011

(65) Prior Publication Data

US 2012/0149284 A1 Jun. 14, 2012

Related U.S. Application Data

(60) Provisional application No. 61/528,569, filed on Aug. 29, 2011, provisional application No. 61/422,323, filed on Dec. 13, 2010.

(51) Int. Cl.
*B24B 1/00* (2006.01)
(52) U.S. Cl. .............................. 451/28; 451/58; 451/66
(58) Field of Classification Search .................. 451/26, 451/58, 66; 28/299
See application file for complete search history.

(56) References Cited

U.S. PATENT DOCUMENTS

| | | | | |
|---|---|---|---|---|
| 2,277,937 | A * | 3/1942 | Shryer | 451/29 |
| 3,565,257 | A | 2/1971 | Cavalieri et al. | |
| 3,667,608 | A | 6/1972 | Burroughs et al. | |
| 3,679,058 | A | 7/1972 | Smith | |
| 3,690,075 | A * | 9/1972 | Schoonmaker et al. | 451/500 |
| 3,968,041 | A | 7/1976 | De Voss | |
| 4,385,412 | A * | 5/1983 | Neufeldt | 15/236.1 |
| 5,165,821 | A | 11/1992 | Fischer et al. | |
| 5,288,349 | A * | 2/1994 | Fink | 156/72 |
| 5,535,945 | A * | 7/1996 | Sferrazza et al. | 241/24.12 |
| 5,580,185 | A | 12/1996 | Ware | |
| 5,679,247 | A | 10/1997 | Burke | |
| 5,704,104 | A * | 1/1998 | Bacon et al. | 28/299 |
| 5,722,603 | A * | 3/1998 | Costello et al. | 241/20 |
| 5,785,259 | A * | 7/1998 | Nishibori | 241/24.18 |
| 6,029,916 | A * | 2/2000 | White | 241/24.19 |
| 6,035,749 | A * | 3/2000 | Haselwander | 83/22 |
| 6,143,172 | A | 11/2000 | Rink et al. | |
| 6,182,913 | B1 * | 2/2001 | Howe et al. | 241/1 |
| 6,565,022 | B1 * | 5/2003 | Clements | 241/29 |
| 6,602,113 | B2 * | 8/2003 | Lemieux | 451/38 |
| 6,743,367 | B2 | 6/2004 | Dreyer | |
| 6,936,201 | B2 * | 8/2005 | Desai et al. | 264/112 |
| 7,115,671 | B2 * | 10/2006 | Courage et al. | 521/49.8 |
| 8,110,131 | B1 * | 2/2012 | Dell'Orco et al. | 264/141 |
| 8,113,448 | B2 * | 2/2012 | Keating | 241/22 |
| 2007/0212531 | A1 * | 9/2007 | McIntyre et al. | 428/297.4 |
| 2011/0040027 | A1 * | 2/2011 | Keating | 524/567 |
| 2011/0220293 | A1 | 9/2011 | Yu | |
| 2012/0037734 | A1 * | 2/2012 | Levy et al. | 241/24.29 |

FOREIGN PATENT DOCUMENTS

WO   WO 2012/082785   6/2012

OTHER PUBLICATIONS

Notification of Transmittal of the International Search Report and the Written Opinion of the International Searching Authority issued Oct. 4, 2012 in International Application No. PCT/US2011/064715, now WO 2012/082785.

\* cited by examiner

*Primary Examiner* — George Nguyen
(74) *Attorney, Agent, or Firm* — Stoel Rives LLP; Samuel E. Webb

(57) ABSTRACT

Devices, systems and methods for the recycling and recovery of carpet are disclosed herein. Devices, systems and methods for disassembling carpet into the various components used for carpet construction by abrasive removal and separation of components are also disclosed herein.

8 Claims, 14 Drawing Sheets

DEVICES, SYSTEMS, AND METHODS FOR RECOVERY AND RECYCLING OF CARPET COMPONENTS

CLAIM OF PRIORITY

This application is claims the benefit of U.S. Provisional Patent Application Nos. 61/422,323, filed Dec. 13, 2010 and 61/528,569, filed Aug. 29, 2011. The entire contents of the foregoing applications are hereby incorporated by reference herein.

TECHNICAL FIELD

The present disclosure relates generally to the recycling and recovery of carpet. Certain embodiments relate more specifically to devices, systems, and methods for disassembling carpet into the various components used for carpet construction by abrasive removal and separation of components.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
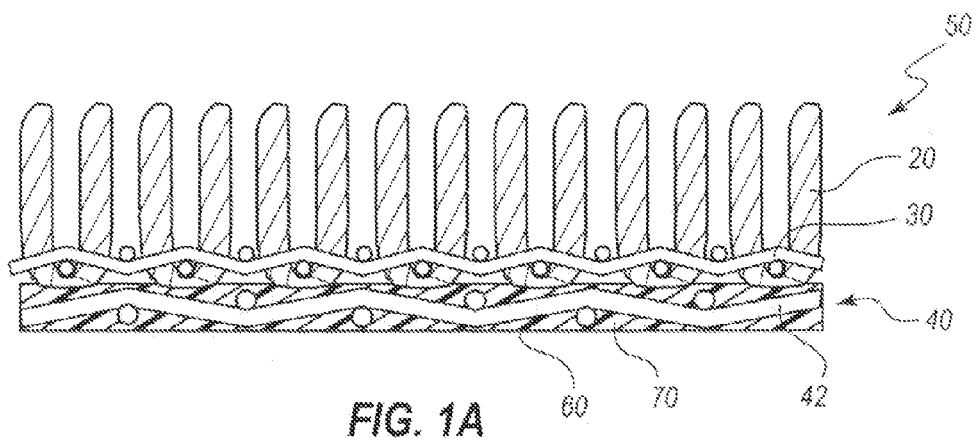
FIG. 1A is a cross sectional view of an exemplary cut pile carpet 50 that may be processed by the methods and systems disclosed herein. This cross sectional view illustrates the cut pile face fibers 20 protruding from the primary backing 30 and a secondary backing 40 that is attached to the bottom surface of the primary backing 30.
Figure 1B:
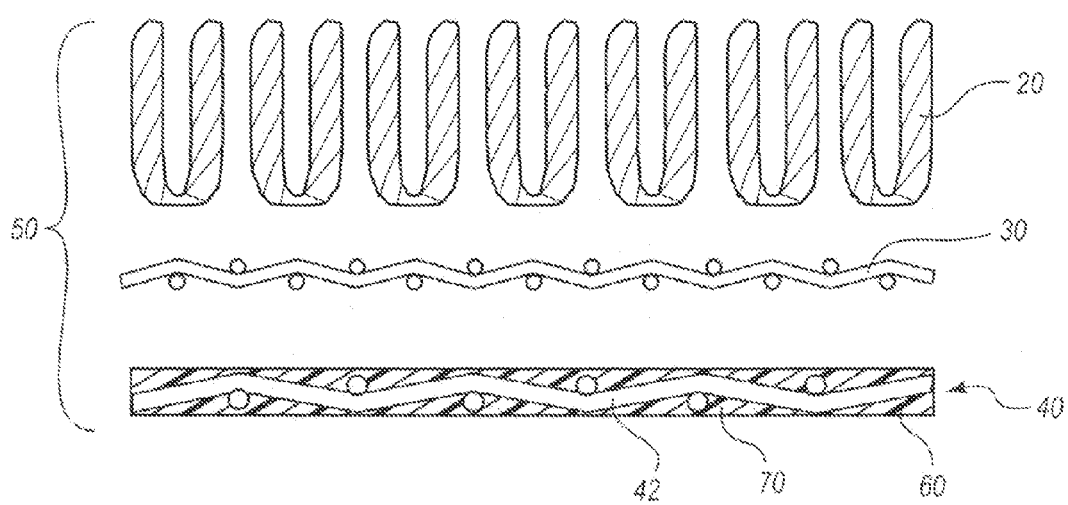
FIG. 1B is a further illustration of the primary components of the cut pile carpet 50 depicted in FIG. 1A.
Figure 2:
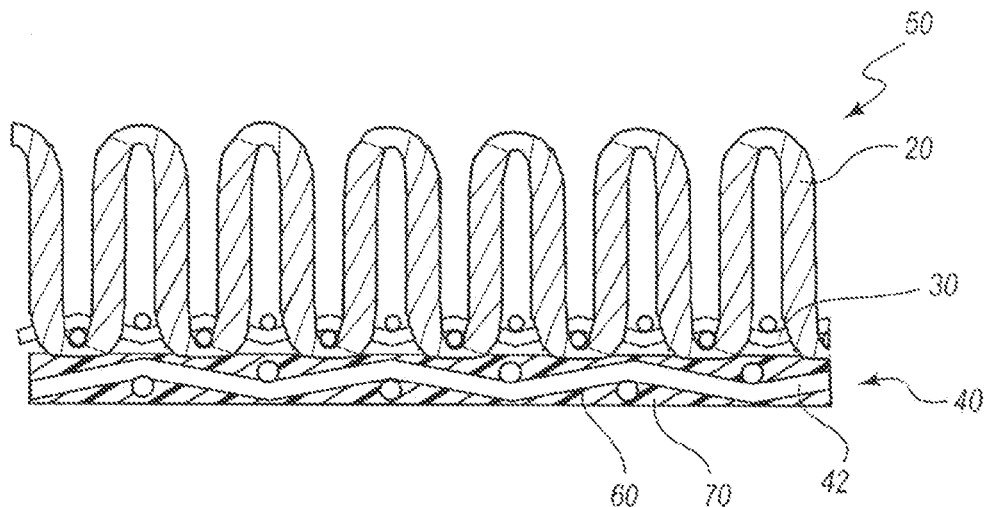
FIG. 2 is a cross sectional view of an exemplary loop pile carpet 50 that may be processed by the methods and systems disclosed herein. This cross sectional view illustrates the loop pile face fibers 20 protruding from the primary backing 30 and a secondary backing 40 that is attached to the bottom surface of the primary backing 30.
Figure 3:
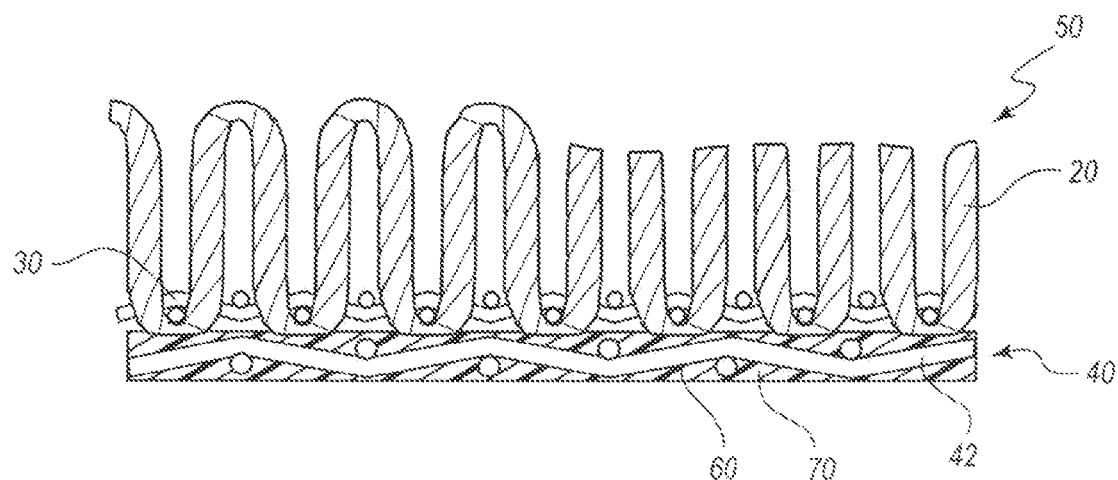
FIG. 3 is a cross sectional view of an exemplary carpet 50 with loop pile and cut pile face fibers 20 that may be processed by the methods and systems disclosed herein.

Devices, systems, and methods for recycling carpet 50 are described herein. The methods, systems and devices disclosed are suited to breaking down post-consumer carpet 50 into components that have significant value as recycled materials. The methods described herein include placing the carpet 50 under tension and separating the material components of the carpet 50 by abrasion. For example, in certain embodiments, the carpet 50 is placed under tension, the secondary backing 40 is removed from the primary backing 30 by abrasion, and the face fiber 20 is abrasively stripped from the primary backing 30. In such an embodiment, the face fiber 20, primary backing 30 and the secondary backing 40 materials can be isolated during the recycling process and, if desired, further processed for use as post-consumer materials. FIGS. 1-3 illustrate cross sectional views of cut pile and loop pile carpets 50 that can be processed by the methods and systems for carpet recycling described herein. The carpets 50 shown in FIGS. 1-3 include cut pile face fibers 20 or loop pile face fibers 20, a primary backing 30, and a secondary backing 40. These carpets 50 include a plurality of cut pile face fibers 20 or loop pile face fibers 20 protruding from the top surface of the primary backing 30. The secondary backing 40 forms the bottom surface of the carpet 50, is adhered or connected to the primary backing 30, and includes one or more fillers 60 and one or more adhesives 70.

The term "face fibers" refers to fibers or yarns made of any one of a number of types of materials, e.g., acrylics, nylons, polypropylene, polyethylene, polyamides, polyesters, wool, cotton, rayon, and the like, that are or can be used to form the pile of a cut pile or loop pile carpet 50.

The term "primary backing" is used herein to refer to a woven or non-woven fabric made of one or more natural or synthetic fibers or yarns such as wool, polypropylene, polyethylene, ethylene-propylene copolymers, polyesters, rayon, and the like. The face fibers 20 of the carpet 50 are affixed to and/or through the primary backing 30.

The term "secondary backing" is used herein to refer to woven or non-woven fabrics made of one or more natural or synthetic fibers or yarns such as wool, polypropylene, polyethylene, ethylene-propylene copolymers, polyesters, rayon, jute and the like. The secondary backing 40 is generally affixed or adhered to the primary backing 30.

The terms "filler" and "fillers" are used herein to refer to substances such as calcium carbonate, glass, coal fly ash, bauxite, calcium sulfite, and the like, which are suitable for use in the manufacture of carpets 50.

The terms "adhesive" and "adhesives" are used herein to refer to substances such as latex and the like, which are suitable for use in the manufacture of carpets 50.

The methods described herein comprise breaking down carpet 50 into its primary components by abrasion. As used herein, "primary component" refers to any of the face fiber 20, the primary backing 30, and the secondary backing 40. The term "abrasion" refers to any technique, process, or technology involving the application of an abrasive to the surface of a material with a mechanical force sufficient to abrade, grind, strip, pull, or otherwise remove the designated component, surface, or layer. For purposes of the present disclosure, "abrasion" includes any sanding or grinding technique, process, or technology suitable for use in the methods described herein for separating carpet 50 into its primary component materials. In certain embodiments, abrasion as contemplated for the methods described herein is carried out using an abrasive drum, an orbital, reciprocating or circular sander, grinding wheels or grinding wheels mounted or stacked onto a shaft, abrasive wire wheels or shafts, or a belt sanding or grinding mechanism. The abrasive material 205 may be a suitable, commercially available abrasive product, such as, sandpaper, abrasive cloth, abrasive particles, hook and loop roll abrasive cloth, and the like. In one embodiment, abrasive particles may be applied to, adhered to, or embedded within the surface of a drum or shaft for use in abrasion as contemplated for the methods described herein. In an alternative embodiment, abrasive particles may be applied to, adhered to, or embedded within the surface of a removable sleeve that can slide or be disposed over the surface of a drum or shaft for use as an abrasive material 205.

In the methods described herein, carpet 50 to be recycled is provided, the secondary backing 40 is removed by abrasion, and the face fibers 20 are stripped from the primary backing 30 by abrasion. Once separated from the carpet 50, the materials forming the primary components may be separately collected for recycling. Therefore, by facilitating the separate collection of the materials forming each of the primary components, the methods described herein greatly facilitate collection of the individual components for recycling, minimize cross-contamination of the recovered materials, and reduce or eliminate the need for further processing of primary component materials prior to their subsequent sale, transport, or use.

In some embodiments, the carpet 50 to be recycled may be cleaned or remediated prior to abrasively breaking down the carpet 50 into its primary components. In further embodiments, the carpet 50 is sized and/or sorted prior to abrasive deconstruction. For example, in some embodiments, the carpet 50 may be graded according to the nature of the face fiber 20 as part of the recycling process. Grading the carpet 50 in this manner reduces the possibility of cross-contamination of face fiber 20 materials recovered from the methods described herein. For example, a system for carrying out the methods described herein may be dedicated to recycling carpets 50 having a certain type or class of face fibers 20. Alternatively, a single system may be used for recycling carpets 50 having any type of face fiber 20, but the carpets 50 may be graded, grouped, and processed according to face fiber 20 type so that different types of face fibers 20 can be collected with little or no contamination with face fibers 20 of a different material.

In certain embodiments, the materials forming the primary components may be further processed to facilitate their sale, transportation, or use as post-consumer recycled materials. For instance, the materials may be washed, or otherwise cleaned, densified, pelletized, baled, etc. Moreover, in some embodiments, once separated from the carpet 50, the primary component materials may be handled or processed to isolate or produce secondary component materials. For example, the secondary backing 40 may include fiber 42, adhesive 70, and filler 60 materials, and once separated from the carpet 50, the material forming the secondary backing 40 may be collected and processed in a manner that isolates one or more secondary component materials (e.g., one or more of the fiber 42, adhesive 70, or filler material 60 recovered from the secondary backing 40). Therefore, in certain embodiments of the methods described herein, the material recovered from the secondary backing 40 is processed to isolate one, or more, or each of the adhesive 70, filler 60, and fiber 42 materials used in the secondary backing 40. For example, the material recovered from the secondary backing 40 may be further processed using a hammer mill, attrition mill or shredder before being separated using a vibratory screen, air cyclone, hydro cyclone, float/sink tank or other suitable separation device or devices configured for use in this context.

To facilitate abrasive removal of the secondary backing 40 and stripping of the face fibers 20 from the primary backing 30, in certain embodiments of the methods described herein, a force is applied to the carpet 50 to prevent significant folding, wrinkling, or deflection of the carpet 50 upon application of the abrasive materials 205 and/or forces. As used herein, a "significant" folding, wrinkling, or deflection of the carpet would include any condition that prevents the high speed abrasive drum 200 from making full and flat contact with the carpet 50 during processing.

In certain embodiments, prior to abrasive deconstruction, the carpet 50 may be immobilized at one or more ends or surfaces. Such immobilization may be carried out using any suitable retention mechanism 105, such as, for example, a clamp, a vice, or other mechanical fixing means, such as one or more hooks or pins. Alternatively, the carpet 50 may be immobilized by sewing multiple pieces of carpet 50 end-to-end forming a continuous roll, which is prevented from turning by using a conventional braking mechanism, thus, keeping the carpet 50 taut and flat during processing. Immobilization of the carpet 50 at one or more ends or surfaces reduces or eliminates folding, wrinkling or deflection of the carpet 50 during processing.

In addition to being immobilized at one or more ends or surfaces, in some embodiments, a tensile force may be additionally applied to the carpet 50. In certain such embodiments, the tensile force is applied in a single direction (e.g., parallel to the length or width of the carpet 50 being recycled), while in other embodiments, tensile forces may be applied in two or more directions (e.g., a first tensile force applied parallel to the length of the carpet 50 and a second tensile force applied parallel to the width of the carpet 50). Again, placing the carpet 50 under one or more tensile forces works to minimize or eliminate issues associated with folding, wrinkling, or deflection of the carpet 50 as it is broken down into its primary components by abrasion. In certain embodiments, a tensile force is applied parallel to the warp yarn of the secondary backing 40. In other embodiments, a tensile force is applied parallel to the weft yarn of the secondary backing 40. In still other embodiments, a first tensile force is applied parallel to the weft yarn of the secondary backing 40 and a second tensile force is applied parallel to the warp yarn of the secondary backing 40. The magnitude of the tensile force(s) applied to the carpet 50 may vary depending on the size and nature of the carpet 50 to be recycled.

Figure 11:
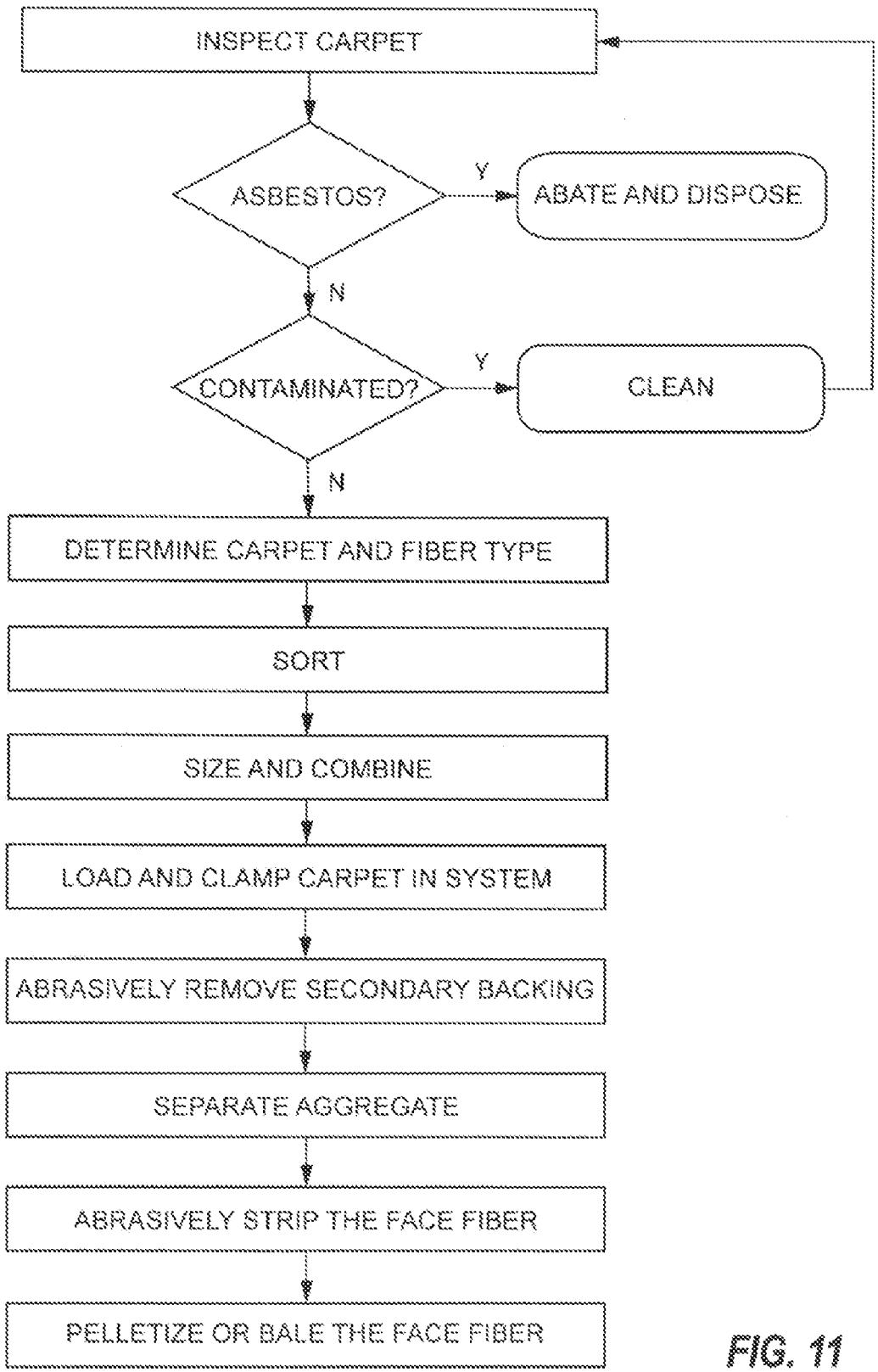
FIG. 11 is a flowchart illustrating an embodiment of the methods for carpet recycling described herein.

FIG. 11 is a flowchart schematically illustrating an embodiment of the methods for recycling carpet 50 as described herein. The method may start with inspection of the carpet 50 to determine if a hazardous contaminant, such as, for example, asbestos, is present. If a hazardous material is present, steps can be taken to abate the hazardous material and, if needed, properly dispose of the carpet 50 without further processing. If a hazardous material is not present, the carpet 50 may be checked for other non-hazardous contaminants and cleaned, if necessary. If the carpet 50 is cleaned to remove contaminants, the carpet 50 may be re-inspected after cleaning to ensure that all contaminants are sufficiently removed before further processing.

Once it is confirmed that the carpet 50 is free of hazardous material and sufficiently clean, the face fiber type of the carpet 50 may be determined so as to properly sort the carpet 50 for further processing with other like carpets 50. The face fiber type of the carpet 50 may be determined using commercially available tools and systems such as a micro-fiber carpet analyzer, such as a Polychromix Phazir™ analyzer, and the like. Once sorted according to the type of face fiber 20, the carpet 50 may be measured and combined according to size in preparation for the abrasive breakdown of the carpet 50. As described herein, the secondary backing is removed by abrasion. In particular embodiments described herein, once the secondary backing is removed, the face fibers are removed by abrasion. Removal of the secondary backing prior to removal and separation of the face fibers eases recovery of the face fibers, allows recovery face fibers that are substantially free of contaminant materials from the secondary backing, and can simplify collection of the primary backing. For example, abrasive removal of the secondary backing followed by abrasive removal of the face fiber results in a primary backing that is substantially intact and substantially or completely free of face fiber or secondary backing materials.

Embodiments of devices and systems suited to recycle carpet 50 according to the methods described herein are illustrated in and described in association with FIGS. 4-10 and FIGS. 12-16. Though the methods and systems described herein are illustrated in FIGS. 4-10 and FIGS. 12-16, it is to be understood that the methods described herein are not limited to the embodiments illustrated. For example, mechanical means different than those specifically illustrated herein for securing the carpet to be recycled while the secondary backing and primary backing materials are removed can be assembled and configured to recycle carpet as described herein.

The system illustrated in FIGS. 4-10 includes a primary drum 100 and one or more high speed abrasive drums 200. The carpet 50 is mounted to the primary drum 100, with at least one end of the carpet 50 immobilized. A plurality of rollers 400 positioned along the outer radius of the primary drum 100 applies at least one tensile force to hold the carpet 50 in place. The one or more spinning high speed abrasive drums 200 may be applied against the carpet 50 to abrasively separate the carpet 50 into its primary component materials. At least one high speed abrasive drum 200 may be applied against the carpet 50 to remove the secondary backing 40 from the primary backing 30. The aggregate mixture 45 (e.g., abraded secondary backing fibers 42, adhesives 70, and fillers 60) is collected by a collection system 500, which may include one or more of a vacuum system 510, one or more filters, a cyclone system, a vibratory screen, and the like. The collection system 500 may be used to further separate the aggregate mixture 45 into its secondary components. The carpet 50 may be turned over and at least one high speed abrasive drum 200 may be applied against the face fibers 20 to separate the face fibers 20 from the primary backing 30. Similarly, the face fibers 20 separated from the primary backing 30 may be collected by a collection system 500, which may include one or more of a vacuum system 510, one or more filters, a cyclone system, a vibratory screen, a face fiber packing system, and the like.

Figure 4:
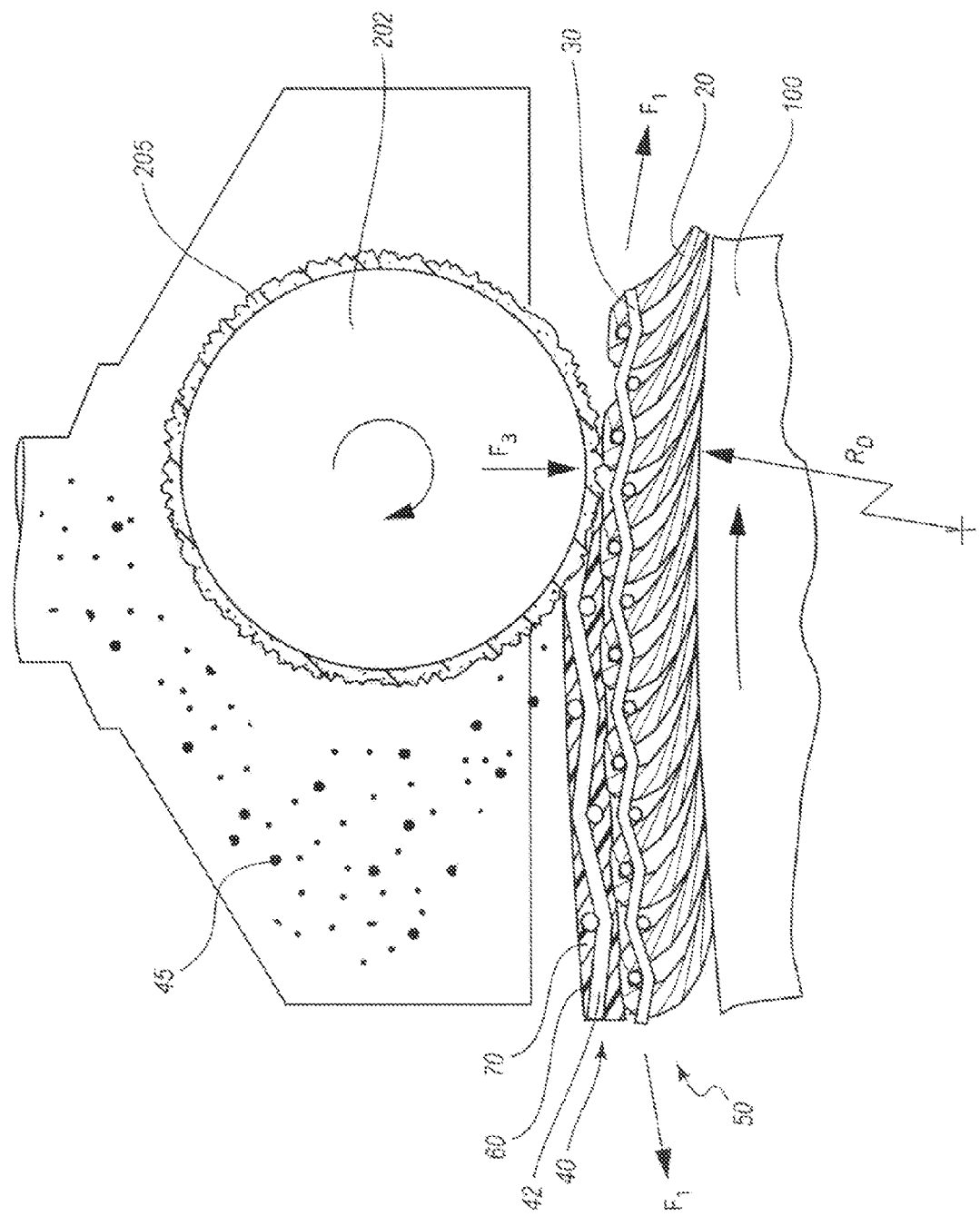
FIG. 4 is a side view of an exemplary carpet recycling system, illustrating a first high speed abrasive drum 202 applying pressure against a carpet 50 held in tension along the outer radius of the primary drum 100. The secondary backing 40 of the carpet 50 is removed as the first high speed abrasive drum 202 spins and applies pressure against the carpet 50.

FIG. 4 illustrates a side view of a first high speed abrasive drum 202 and primary drum 100. Shown in FIG. 4 is a primary drum 100, the radius of the primary drum 100 (represented by $R_D$), a first high speed abrasive drum 202, an abrasive material 205, a carpet 50, and an aggregate mixture 45. An aggregate mixture 45 may include abraded secondary backing fibers 42, adhesives 70, and/or fillers 60 that are removed from the bottom surface of a carpet 50 by at least one high speed abrasive drum 200. The primary drum 100 may be configured to receive and secure carpet 50 with the secondary backing 40 facing towards the first high speed abrasive drum 202. One or more tensile forces (represented by force arrows $F_1$) may be applied to hold the carpet 50 along the outer radius of the primary drum 100. The first high speed abrasive drum 202 may include or be fitted with an abrasive material 205, and pressure (represented as force arrow $F_3$) may be applied by the first high speed abrasive drum 202 against the carpet 50 to remove the secondary backing 40. After the secondary backing 40 is abraded from the primary backing 30, the carpet 50 may be turned over so that the face fibers 20 are positioned to come into contact with at least one high speed abrasive drum 200 in preparation for stripping the face fibers 20 from the primary backing 30. In embodiments of the system illustrated in FIGS. 4-10, and where the carpet 50 is affixed to the primary drum 100 at one end, turning the carpet 50 over may be accomplished by reversing the rotational direction of the primary drum 100.

Figure 5:
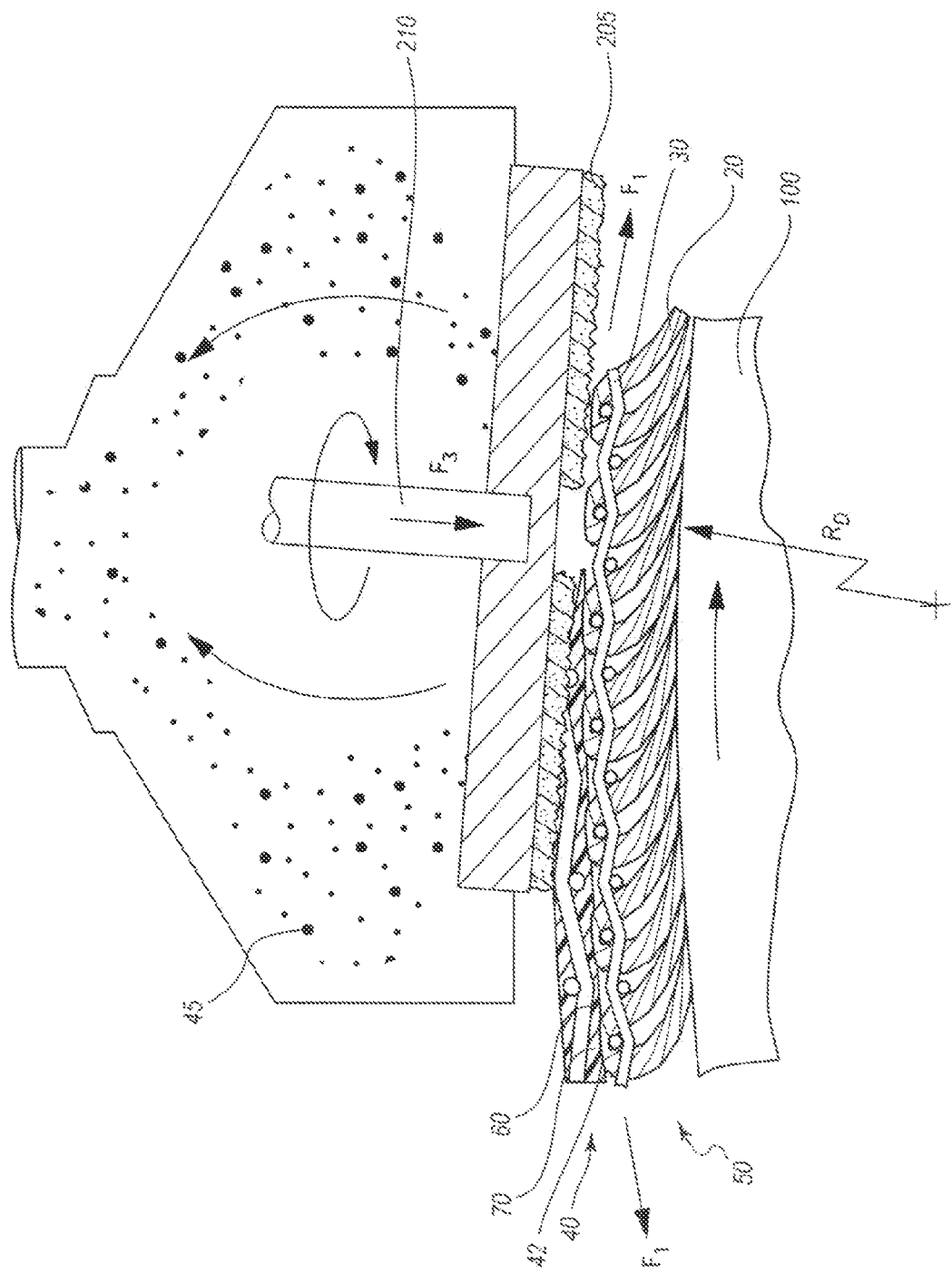
FIG. 5 is a side view of an exemplary carpet recycling system, illustrating an abrasive circular rotating device 210 applying pressure against a carpet 50 held in tension along the outer radius of the primary drum 100. The secondary backing 40 of the carpet 50 is removed as the abrasive circular rotating device 210 spins and applies pressure against the carpet 50.

FIG. 5 illustrates an alternative to the one or more high speed abrasive drums 200. In particular, as shown in FIG. 5, a circular rotating abrasive device 210 may be used as an alternative to a high speed abrasive drum 200. Shown in FIG. 5 is a primary drum 100, the radius of the primary drum 100 (represented as $R_D$), a circular rotating abrasive device 210, and an abrasive material 205. The primary drum 100 may be configured to receive and secure a carpet 50 with the secondary backing 40 facing the circular rotating abrasive device 210. The carpet 50 may be held in tension along the outer radius of the primary drum 100. The circular rotating abrasive device 210 may be fitted with an abrasive material 205, and pressure (represented as force arrow $F_3$) may be applied by the circular rotating abrasive device 210 against the carpet 50 to separate the secondary backing 40 from the primary backing 30 of the carpet 50. After the secondary backing 40 is abraded from the primary backing 30, the carpet 50 may be turned over so that the face fibers 20 are positioned to come into contact with at least one high speed abrasive drum 200 in preparation for stripping the face fibers 20 from the primary backing 30. In embodiments of the system illustrated in FIGS. 4-10, and where the carpet 50 is affixed to the primary drum 100 at one end (shown in FIGS. 7-10 and FIG. 12), turning the carpet 50 over may be accomplished by reversing the rotational direction of the primary drum 100.

As illustrated in FIGS. 4 and 5, removal of the secondary backing 40 with abrasion results in an aggregate mixture 45 of abraded secondary backing fiber 42, adhesive 70, and filler 60 materials. Once separated from the primary backing 30, the aggregate mixture 45 may be collected and processed in a manner that isolates one or more secondary component materials (e.g., secondary backing fiber 42, adhesive 70, and filler 60 materials). In certain embodiments described herein, the aggregate mixture 45 may be captured and separated into its secondary components by a collection system 500, including any combination of a vacuum system 510 (shown in FIG. 12), one or more filters, a cyclone system, a vibratory screen, or any other physical or mechanical separation device.

In one embodiment, a vacuum system 510 may be used to collect the aggregate mixture 45 released from the abrasion and a cyclone system may be used to transfer the aggregate mixture 45 to a vibratory screen. The vibratory screen may be used to separate the aggregate mixture 45 into its secondary components materials. Where a vacuum system 510 is used to collect the aggregate mixture 45 released from the abrasion, the vacuum system 510 may be configured to facilitate the mechanical separation of the secondary backing fiber 42 from adhesive 70 and filler 60 materials. For example, the conduit within which a vacuum is generated may include one or more drops, chutes, or openings (not shown) where larger-sized or heavier materials (such as, e.g., a collection of secondary backing fiber 42) will drop away and separate from lighter adhesive 70 and filler 60 materials as they are pulled through the vacuum system 510 to be collected (such as by a cyclone collection system). Alternatively or in addition, in certain embodiments, a vacuum system 510 may include one or more filters sized and configured to separate one or more of the secondary component materials included in the aggregate mixture 45. For example, the vacuum system 510 may include a filter, screen, sieve, mesh, or other suitable mechanism configured to capture and collect one or more of the secondary backing fibers 42 or the adhesive 70 and filler 60 materials. The vacuum systems 510 described herein may include a cyclone system that is configured to collect or further separate the aggregate mixture 45 collected by the vacuum system 510 and received into the cyclone system. In order to generate the negative pressure within the vacuum system, an inline fan suitable for pulling the aggregate mixture 45 through the vacuum system 510 may be used.

Figure 6:
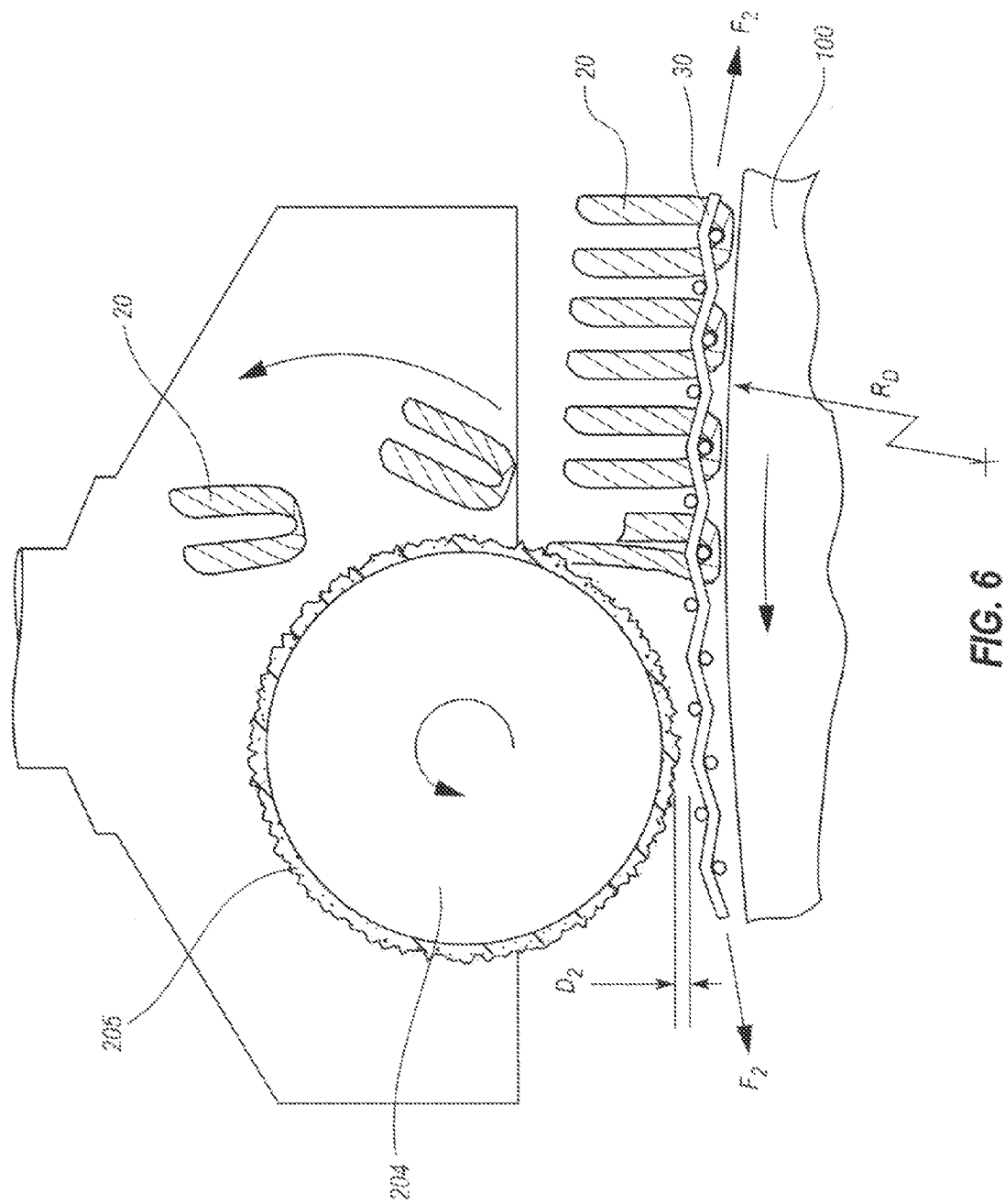
FIG. 6 is a side view of an exemplary carpet recycling system, illustrating a second high speed abrasive drum 204, a primary drum 100, and a carpet 50 (without a secondary backing 40) held in tension over the outer radius of the primary drum 100. The face fibers 20 of the carpet 50 are plucked from the primary backing 30 as the second high speed abrasive drum 204 spins and applies pressure against the face fibers 20.

FIG. 6 illustrates the carpet 50 after removal of the secondary backing 40 and after the carpet 50 has been turned over to expose the face fibers 20 to a second high speed abrasive drum 204 for further processing. Shown in FIG. 6 is a primary drum 100, the radius of the primary drum 100 (represented by $R_D$), a second high speed abrasive drum 204, an abrasive material 205, and a plurality of face fibers 20 woven into a primary backing 30. The primary backing 30 may be held by at least one tensile force (represented by force arrows $F_2$) along the outer radius of the primary drum 100 with the face fibers 20 facing the second high speed abrasive drum 204. As pressure (represented as force arrow $D_2$) is applied by the spinning second high speed abrasive drum 204 against the face fibers 20 of the carpet 50, the second high speed abrasive drum 204 abrasively removes the face fibers 20 from the top surface of the primary backing 30. The second high speed abrasive drum 204 may be similar or identical in construction and/or operation to the first high speed abrasive drum 202.

In certain embodiments, the second high speed abrasive drum 204 may also be an orbital, reciprocating or circular sander, or a belt sanding or grinding mechanism. Abrasive removal of the face fibers 20 from the primary backing 30 results in separated face fibers 20, which may be captured with a collection system 500. In certain embodiments, the separated face fibers 20 may be collected and processed by a collection system 500, including any combination of a vacuum system 510, a cyclone system, a face fiber packing system, and the like. In one embodiment, the separated face fibers 20 may be delivered to a container 520 from a cyclone or a vacuum system. Depending upon the final disposition of the face fibers 20, the face fibers 20 may be cleaned or further processed. In some embodiments, the face fibers may be densified, pelletized, or baled.

Figure 7:
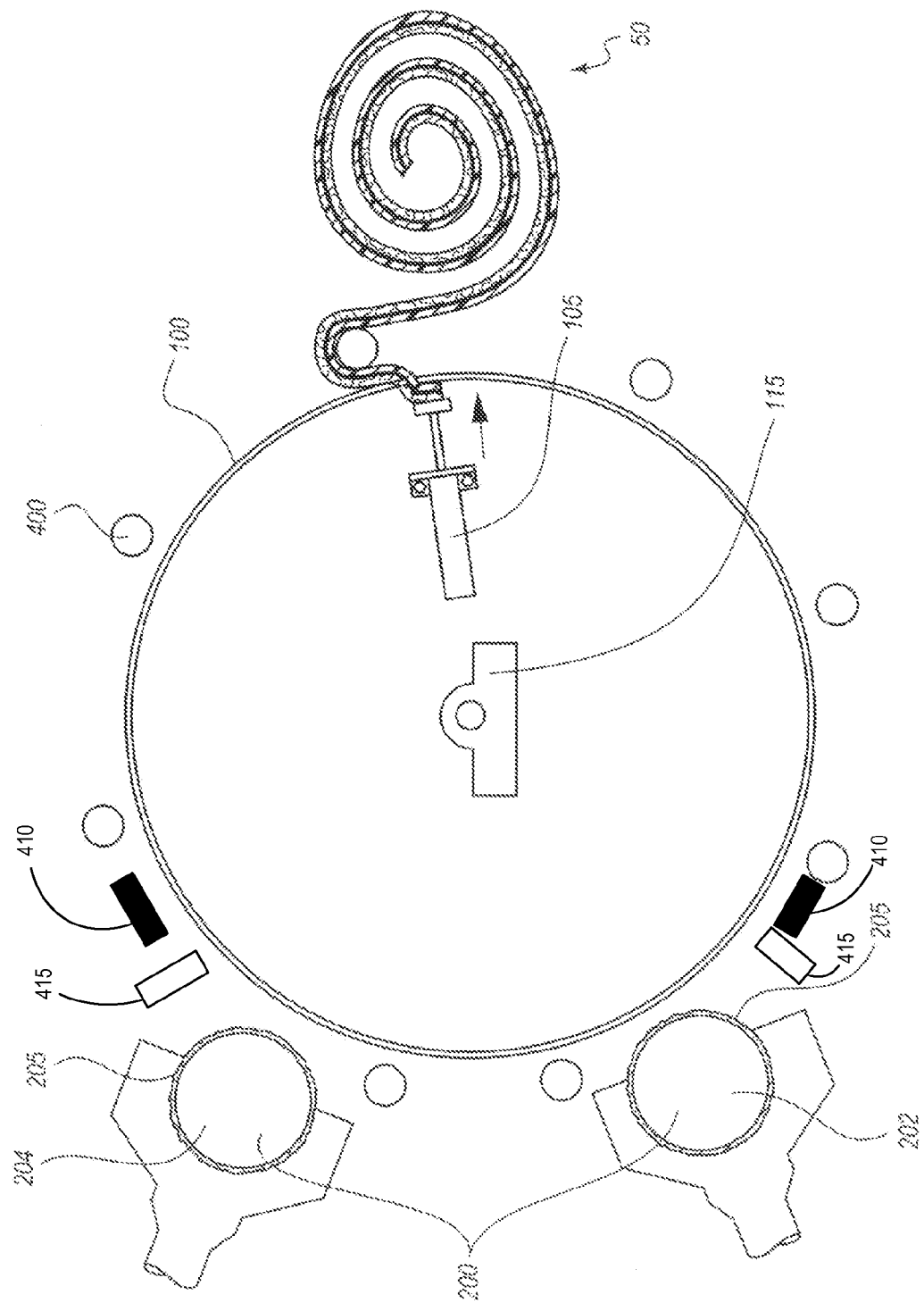
FIG. 7 is a schematic diagram of an exemplary carpet recycling system, illustrating a set of high speed abrasive drums 200 (also shown as a first high speed abrasive drum 202 and a second high speed abrasive drum 204), a primary drum 100, a plurality of rollers 400 positioned along the outer radius of the primary drum 100, and a carpet 50 attached to a retention mechanism 105 on the primary drum 100.

FIG. 7 schematically illustrates an exemplary carpet recycling system according to one aspect of the present description. Shown in FIG. 7 is a set of high speed abrasive drums 200 (shown as a first high speed abrasive drum 202 and a second high speed abrasive drum 204), one or more screeds 410, one or more sensors 415, a primary drum 100, a retention mechanism 105 affixed to the primary drum 100, and a plurality of rollers 400. As shown, carpet 50 is being loaded onto the carpet recycling system in preparation for removal of the secondary backing 40. The carpet recycling system can be configured to permit manual loading of carpet 50 onto the primary drum 100, or the system can be configured to provide automatic loading of carpet 50, such as by the inclusion of a conveyor and loading system (not shown) configured to automatically load carpet 50 onto the primary drum 100. In certain embodiments, the carpet 50 may be oriented and loaded onto the primary drum 100, such that the warp yarn follows the outer radius of the primary drum 100, while the weft yarn lies perpendicular to the outer radius of the primary drum 100. Where the secondary backing 40 includes polypropylene yarns, generally, the warp yarn is relatively shiny in appearance, while the weft yarn, which retains relatively more filler 60 and adhesive 70 material is relatively dull. The edges of the carpet 50, which may be cut and/or squared prior to processing, may be secured to the primary drum 100 using a retention mechanism 105 (for example, the retention mechanisms described herein) to hold the carpet 50 in place as the primary drum 100 rotates in a direction that allows the secondary backing 40 to face away from the primary drum 100.

As the primary drum 100 rotates to pull carpet 50 through the plurality of rollers 400 and along the outer radius of the primary drum 100, the rollers 400 apply a force against the carpet 50 to maintain tension and to remove wrinkles and creases that may be present. One or more pneumatic cylinders may be connected or otherwise attached to the plurality of rollers 400 along the outer radius of the primary drum 100 to apply a force that pulls the plurality of rollers 400 against the primary drum 100. In certain embodiments, the force applied to the one or more pneumatic cylinders is selected from approximately 20 to 500 pounds per square inch; approximately 20 to 250 pounds per square inch; approximately 20 to 150 pounds per square inch; approximately 20 to 100 pounds per square inch; approximately 50 to 500 pounds per square inch; approximately 50 to 250 pounds per square inch; approximately 50 to 150 pounds per square inch; and approximately 50 to 100 pounds per square inch. In a specific embodiment, the force applied to the one or more pneumatic cylinders is approximately 80 pounds per square inch. In one embodiment, the force applied by the rollers 400 to hold the carpet 50 in tension ranges from approximately 150 to 1,500 pounds per square inch. In certain such embodiments the force applied is selected from the following ranges: approximately 250 to 1,500 pounds per square inch; approximately 250 to 1,250 pounds per square inch; approximately 250 to 1,000 pounds per square inch; approximately 500 to 1,500 pounds per square inch; approximately 500 to 1,250 pounds per square inch; approximately 500 to 1,000 pounds per square inch; approximately 750 to 1,500 pounds per square inch; approximately 750 to 1,250 pounds per square inch; and approximately 750 to 1,000 pounds per square inch.

Where a carpet recycling system as described herein includes one or more screeds 410 to minimize or eliminate folding, wrinkling, or deflection of the carpet 50 as it approaches the high speed abrasive drums 200, the one or more screeds 410 may be positioned parallel to the plurality of rollers 400, along the outer radius of the primary drum 100. In some embodiments, the one or more screeds 410 may be situated adjacent to either or both of the first 202 and second 204 high speed abrasive drums. The screeds 410 may be constructed from any suitable material, including, but not limited to, steel, aluminum, iron, and the like.

A screed 410 utilized in a carpet recycling system according to the present description may be configured such that it has a substantially planar surface that comes into contact with the carpet 50 disposed over the outer radius of the primary drum 100. In an alternative embodiment, the screed 410 may have a substantially concave surface that may be nested against the non-planar cylindrical surface of the primary drum 100. A screed 410 will generally be configured such that, by either or both of its weight or application of a mechanical force to the screed 410, the screed 410 applies a desired pressure across the surface of the carpet 50 that comes into contact with the screed 410. The pressure applied against the carpet 50 creates an even tension along the carpet 50, which further reduces or eliminates wrinkles, creases, or deflections in the carpet 50 prior to contact with one or more high speed abrasive drums 200. In certain embodiments, the screed 410 may be attached or otherwise connected to a frame structure (not shown). In further embodiments, the screed 410 may be slidably or hingeably attached to the frame structure, such that the proximity of the screed 410 to the carpet 50 disposed over the primary drum 100 may be adjusted accordingly.

Figure 8:
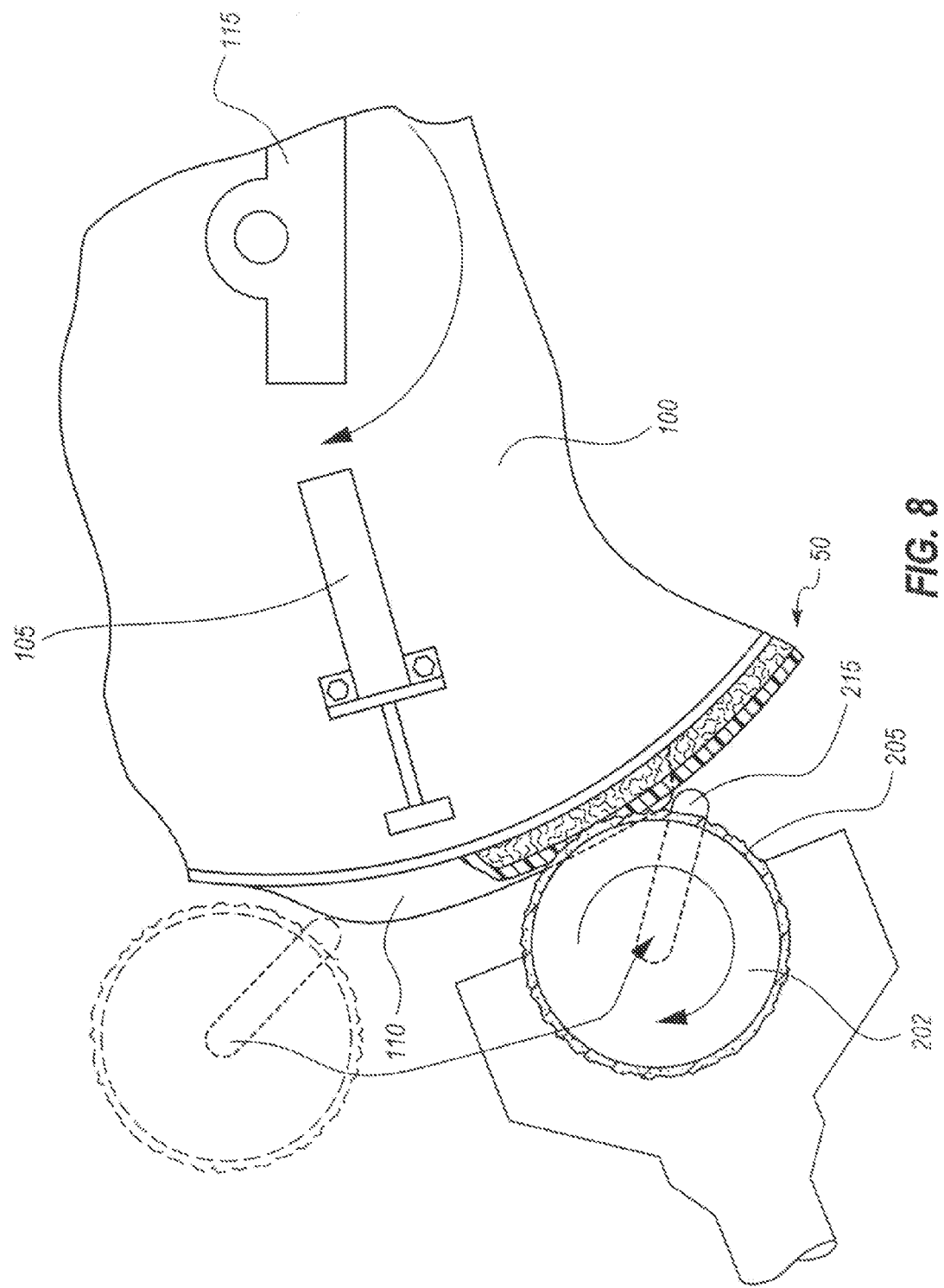
FIG. 8 is a side view of an exemplary carpet recycling system, illustrating a small ramp 110 affixed to the outer edge of the primary drum 100 for easing the second high speed abrasive drum 202 into first contact with the carpet 50.

A small ramp 110 (shown in FIG. 8) may be affixed to the outer edge of each side of the primary drum 100 to ease the high speed abrasive drums 200 into first contact while the carpet 50 is held in tension along the outer radius of the primary drum 100 by the plurality of rollers 400. FIG. 8 illustrates a primary drum 100, a retention mechanism 105, a small ramp 110, and a first high speed abrasive drum 202 fitted with an abrasive material 205. The small ramp 110 may be affixed to the outer edge of each side of the primary drum 100 and adjacent to the retention mechanism 105 that is used to secure the edges of the carpet 50 to the primary drum 100. Small wheels 215 may also be affixed to each side of the high speed abrasive drums 200 to ease the high speed abrasive drums 200 into first contact with the carpet 50. As illustrated in FIG. 8, the small wheels 215 may aid in rolling the first high speed abrasive drum 202 onto the small ramp 110, before easing the first high speed abrasive drum 202 into first contact with the carpet 50. The use of a small ramp 110 and wheels 215 on the first high speed abrasive drum 202 may reduce the likelihood of backlash in the primary drum 100 upon first contact and decrease the likelihood of burn through of the carpet during abrading. The second high speed abrasive drum 204 may be similar or identical in construction and/or operation to the first high speed abrasive drum 202. The second high speed abrasive drum 204 may also include small wheels 215 affixed to each side of the second high speed abrasive drum 204 to ease the second high speed abrasive drum 204 into first contact with the carpet 50.

In one embodiment, the high speed abrasive drums 200 may be fitted with a pressure-maintaining mechanism (not shown) to maintain a substantially even pressure against the carpet 50 sufficient to effectively separate the secondary backing 40 and/or face fibers 20 from the primary backing 30. Examples of such pressure-maintaining mechanisms may include pneumatic cylinders, coil spring mechanisms, hydraulic cylinders, and the like.

The speed of the primary drum 100 and the high speed abrasive drums 200, the pressure applied by the high speed abrasive drums 200 against the carpet 50, the pressure with which the carpet 50 is affixed to the primary drum 100, and the tension exerted across the carpet 50 by, for example, the forces applied by the plurality of rollers 400 may be adjusted so as to minimize or prevent uneven or inconsistent removal and isolation of the individual components of the carpet 50 being recycled. For example, one or more of each of these parameters may be adjusted according to the characteristics (e.g., thickness, size, density, etc.) and/or nature (e.g., face fiber type, materials used in secondary and primary backings, etc.) of the carpet 50 being recycled.

In some embodiments, the system may include one or more sensors 415 capable of assessing one or more qualities of the carpet 50 being recycled, such as the thickness, size, density, face fiber type, and materials used in secondary and primary backings, etc. Input received from such sensors 415 can be used to adjust, as needed, one or more system parameters (e.g., the speed of the primary drum 100, the speed of the high speed abrasive drums 200, the pressure applied by the high speed abrasive drums 200 against the carpet 50, the pressure with which the carpet 50 is affixed to the primary drum 100, and the tension exerted across the carpet 50 by, for example, the forces applied by the plurality of rollers 400).

Where one or more sensors 415 are provided, the one or more sensors 415 may be positioned in proximity to or in direct contact with the carpet 50 to be recycled as the carpet 50 is prepared for, positioned within, or processed by the carpet recycling system. For example, one or more sensors 415 may be positioned and configured to sense the movement or displacement of the one or more rollers 400 or the one or more screeds 410 positioned along the outer radius of the primary drum 100 to allow adjustment of one or more of the speed of the primary drum 100, the speed of the high speed abrasive drums 200, and the amount of pressure to be applied against the carpet 50 based on, for example, the size, density, or thickness of the carpet 50. One or more sensors 415 may also be positioned and configured to assess the carpet 50 to be recycled as it is loaded into primary drum 100. Any sensor 415 suitable for sensing and communicating information regarding the characteristics and/or the nature of the carpet 50 may be utilized. In particular embodiments, the one or more sensors 415 may be coupled or associated with an automatic or programmable control system capable of automatically adjusting one or more system parameters in light of information received from the one or more sensors 415.

The carpet recycling system may also include a drum-aligning means (not shown) to keep the high speed abrasive drums 200 in line with the primary drum 100. Examples of such drum-aligning means may include a gear rack and pinion assembly (not shown), and the like.

Figure 9:
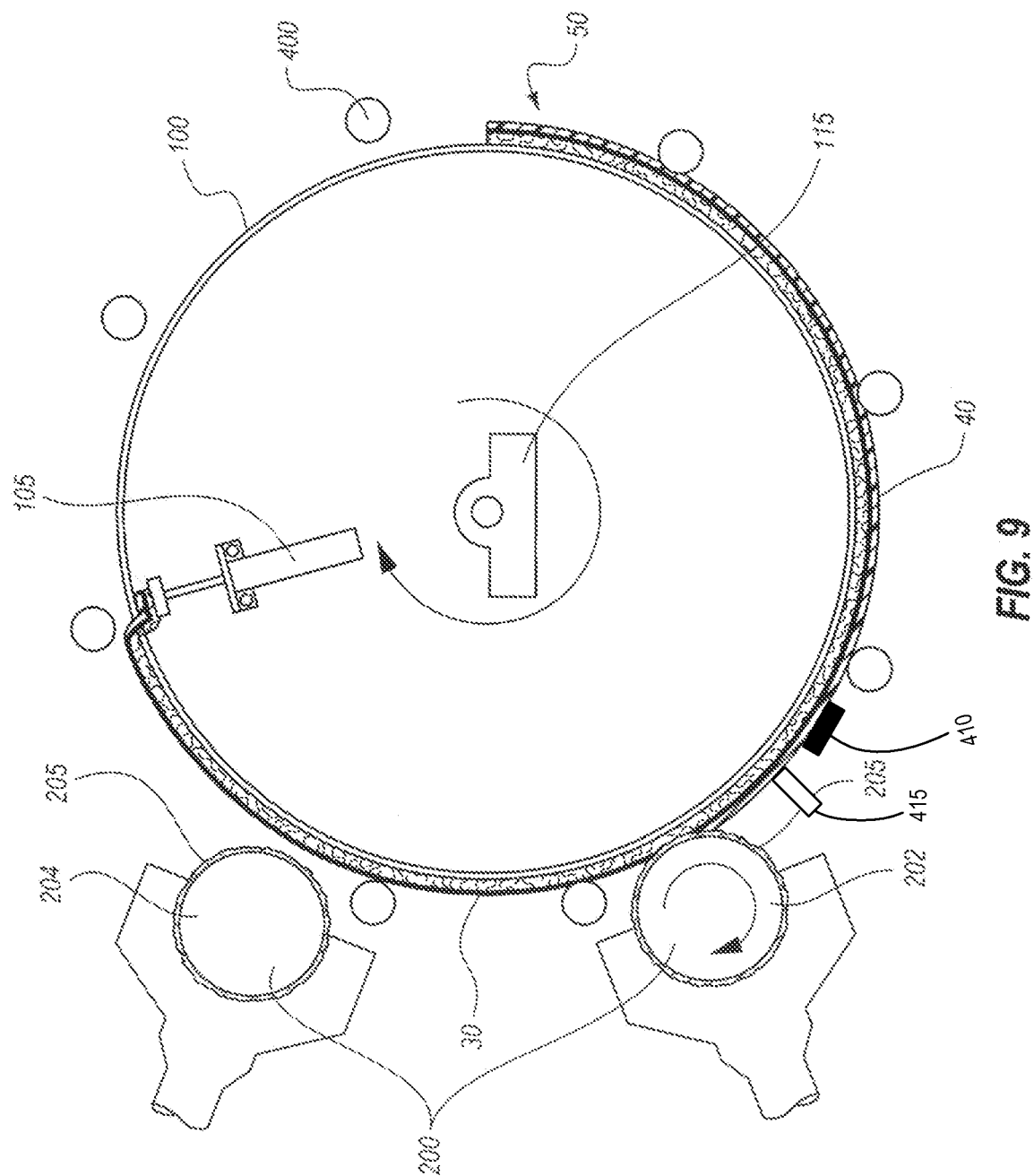
FIG. 9 is a side view of an exemplary carpet recycling system, illustrating a downward facing carpet 50 held in tension by a retention mechanism 105 and a plurality of rollers 400 positioned along the outer radius of a primary drum 100, while the secondary backing 40 of the carpet 50 is abraded by the first high speed abrasive drum 202.

FIG. 9 illustrates a side view of the secondary backing 40 being removed by the first high speed abrasive drum 202. Shown in FIG. 9 is a primary drum 100, a first high speed abrasive drum 202, a second high speed abrasive drum 204, an abrasive material 205, a retention mechanism 105, a screed 410, a sensor 415, and a plurality of rollers 400. As shown in FIG. 9, a carpet 50 is held in tension along the outer radius of a primary drum 100 by a retention mechanism 105 and a plurality of rollers 400, such that the secondary backing 40 of the carpet 50 faces the first high speed abrasive drum 202. A screed 410 may be positioned adjacent to the first high speed abrasive drum 202 to minimize or eliminate any wrinkles, creases, or deflections in the carpet 50 prior to contact with the first high speed abrasive drum 202. The primary drum 100 rotates around its axis while the first high speed abrasive drum 202 spins and comes into contact to the carpet 50. The first high speed abrasive drum 202 applies a constant pressure against the carpet 50 and operates at a speed sufficient to effectively remove the secondary backing 40.

The primary drum 100 may be rotated by a rotating means 115 at a variable speed. Examples of such rotating means 115 may include a hydraulic drive, a hydraulic drive and gear reduction system, an electric drive, an electric drive and gear reduction system, a chain drive, a chain drive and gear reduction system, a friction drive, a friction drive and gear reduction system, and the like.

In addition, the primary drum 100 may rotate at a variable speed suitable to effectively separate the secondary backing 40 and/or face fibers 20 from the primary backing 30. The speed at which the primary drum 100 rotates may vary depending on the size and nature of the carpet 50 to be recycled. In one embodiment, the primary drum 100 may rotate at a speed ranging from about 1 to 100 feet per minute. In certain examples of such an embodiment, the primary drum may rotate at a speed selected from about 2-50 feet per minute, about 2-30 feet per minute, about 2-20 feet per minute, about 2-15 feet per minute, about 2-10 feet per minute, about 2-5 feet per minute, about 15-75 feet per minute, about 15-65 feet per minute, about 15-55 feet per minute, about 15-45 feet per minute, about 15-35 feet per minute, about 15-25 feet per minute, about 25-100 feet per minute, about 25-75 feet per minute, about 25-65 feet per minute, about 25-55 feet per minute, about 25-45 feet per minute, and about 25-35 feet per minute. In a particular embodiment, the primary drum 100 may rotate at a speed ranging from about 18-60 feet per minute (ft/min). In another specific embodiment, the primary drum 100 may rotate at a speed of 2-3 revolutions per minute (RPM). The pressure applied to the high speed abrasive drums 200 is directly proportional to the speed of the primary drum 100, as well as the width of the carpet 50 retained in the primary drum 100 and the density of the face fiber 20 of the carpet 50.

The speed at which the high speed abrasive drums 200 rotate may be varied to suit a particular application. In each embodiment, the speed of the high speed abrasive drum 200 is set at a speed that effectively removes the desired carpet component without substantially removing or altering additional components. For example, the high speed abrasive drums may be configured to rotate at a speed ranging from about 500-RPM to 10,000-RPM. In certain such embodiments, the high speed drums can be selected and configured to rotate at a range of speeds selected from about 500-RPM to 7,500-RPM, about 500-RPM to 5,000-RPM, about 500-RPM to 3,500-RPM, about 500-RPM to 2,500-RPM, about 750-RPM to 7,500-RPM, about 750-RPM to 5,000-RPM, about 750-RPM to 3,500-RPM, about 750-RPM to 2,500-RPM, about 1,000-RPM to 7,500-RPM, about 1,000-RPM to 5,000-RPM, about 1,000-RPM to 3,500-RPM, and about 1000-RPM to 2,500-RPM. In one embodiment, the high speed abrasive drums 200 may operate at standard motor speed of 1800-RPM with a one-to-one belt drive. In an alternative embodiment, the high speed abrasive drums 200 may operate at a speed of approximately 4,200 feet per minute.

The amount of force to be applied by the high speed abrasive drums 200 fitted with pressure-maintaining mechanisms depends on, for example, the amount and qualities (e.g., the characteristics, such as thickness, size, density, etc., and/or nature, such as face fiber type, and materials used in secondary and primary backings, etc.) of the carpet 50 being processed. The amount of pressure applied by the high speed abrasive drums may also be adjusted according to the speed at which the high speed abrasive drums 200 and the primary drum 100 rotate. In certain embodiments, the high speed abrasive drums apply a force selected from the following ranges: approximately 2 to 50 pounds of force per inch of carpet width retained by the primary drum 100; approximately 2 to 35 pounds of force per inch of carpet width retained by the primary drum 100; approximately 2 to 25 pounds of force per inch of carpet width retained by the primary drum; approximately 2 to 20 pounds of force per inch of carpet width retained by the primary drum 100; approximately 2 to 15 pounds of force per inch of carpet width retained by the primary drum 100; and approximately 2 to 10 pounds of force per inch of carpet width retained by the primary drum 100. In other embodiments, the high speed abrasive drums apply a force selected from the following ranges: approximately 4 to 50 pounds of force per inch of carpet width retained by the primary drum 100; approximately 4 to 35 pounds of force per inch of carpet width retained by the primary drum 100; approximately 4 to 25 pounds of force per inch of carpet width retained by the primary drum; approximately 4 to 20 pounds of force per inch of carpet width retained by the primary drum 100; approximately 4 to 15 pounds of force per inch of carpet width retained by the primary drum 100; and approximately 4 to 10 pounds of force per inch of carpet width retained by the primary drum 100. In still further embodiments, In other embodiments, the high speed abrasive drums apply a force selected from the following ranges: approximately 2 to 8 pounds of force per inch of carpet width retained by the primary drum 100; approximately 2 to 7 pounds of force per inch of carpet width retained by the primary drum 100; approximately 2 to 6 pounds of force per inch of carpet width retained by the primary drum; approximately 2 to 5 pounds of force per inch of carpet width retained by the primary drum 100; approximately 4 to 8 pounds of force per inch of carpet width retained by the primary drum 100; approximately 4 to 7 pounds of force per inch of carpet width retained by the primary drum 100; approximately 4 to 6 pounds of force per inch of carpet width retained by the primary drum 100; and approximately 4 to 5 pounds of force per inch of carpet width retained by the primary drum 100. In a specific embodiment, the high speed abrasive drums 200 apply approximately 4 to 6 pounds of force per inch of carpet width retained by the primary drum 100 operating at approximately 3-RPM.

The high speed abrasive drums 200 may also be attached or otherwise connected to a frame structure. In one embodiment, the high speed abrasive drums 200 may be hingeably or slidably attached to the frame structure (not shown), such that the proximity of the high speed abrasive drums 200 to the primary drum 100 can be adjusted accordingly. In certain embodiments, the high speed abrasive drums 200 may connected to the same frame structure (not shown) that is connected to the one or more screeds 410.

Abrasive material 205 may be selected from any material suitable for abrading or sanding that is sufficiently flexible to wrap around a high speed abrasive drum 200, including sandpaper, carbide grit, diamond grit, zirconium grit, abrasive cloth, hook and loop roll abrasive, and the like. In one embodiment, the abrasive material 205 comprises abrasive particles ranging from one of approximately 10-200 grit, 10-100 grit, 10-75 grit, 10-65 grit, 10-50 grit, 10-25 grit, 15-200 grit, 15-100 grit, 15-75 grit, 15-65 grit, 15-50 grit, 15-25 grit, 20-200 grit, 20-100 grit, 20-75 grit, 20-65 grit, 20-50 grit, and 20-25 grit. In a specific embodiment, the abrasive material 205 comprises abrasive particles ranging from approximately 24-60 grit. The high speed abrasive drums 200 may be machined out of a solid steel shaft and balanced to accommodate smooth operation at high speed, such that the abrasive material 205 can be quickly and easily replaced while maintaining drum balance and, therefore, low vibration, which works to provide improved bearing life and relatively low cost of operation. In an alternative embodiment, the high speed abrasive drums 200 may be replaced with one or more grinding wheels, one or more abrasive wire wheels or shafts, one or more shafts containing abrasive particles applied to, adhered to, or embedded within the surface of the one or more shafts, one or more shafts with removable sleeves containing abrasive particles applied to, adhered to, or embedded within the surface of the removable sleeves, or other suitable abrasive means that are configured for use in this context.

Figure 10:
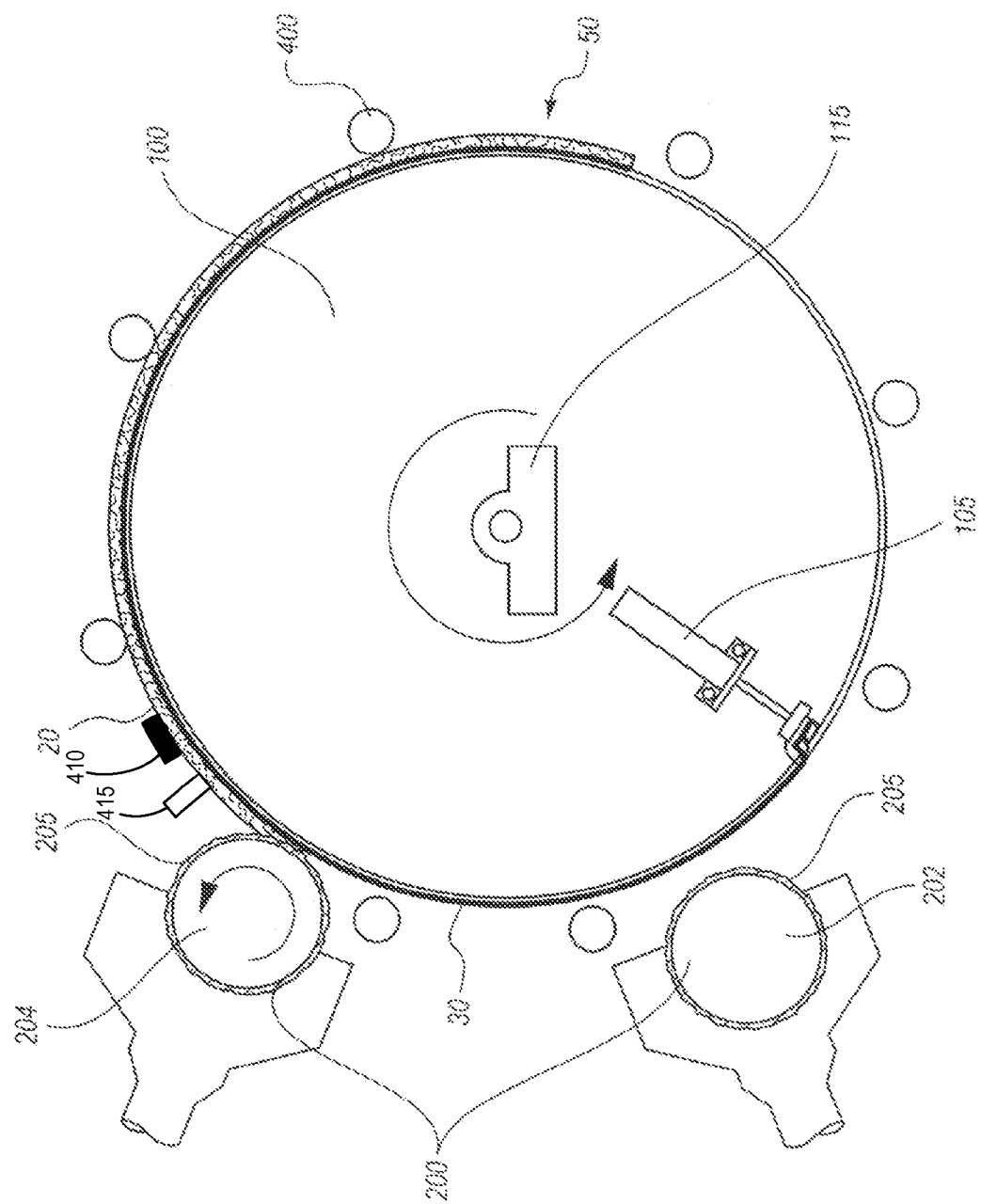
FIG. 10 is a side view of an exemplary carpet recycling system, illustrating an upward facing carpet 50 (without a secondary backing 40) held in tension by a retention mechanism 105 and a plurality of rollers 400 positioned along the outer radius of a primary drum 100, while face fibers 20 are being plucked from the primary backing 30 by the second high speed abrasive drum 204.

FIG. 10 illustrates a side view of face fibers 20 being separated from the primary backing 30 by a second high speed abrasive drum 204. Shown in FIG. 10 is a primary drum 100, a first high speed abrasive drum 202, a second high speed abrasive drum 204, a retention mechanism 105, a screed 410, a sensor 415, and a plurality of rollers 400. As shown in FIG. 10, the secondary backing 40 of the carpet 50 from FIG. 9 has been abraded by the first high speed abrasive drum 202. The rotational direction of the primary drum 100 may be reversed and the carpet 50 turned over to expose the face fibers 20. A screed 410 may be positioned adjacent to the second high speed abrasive drum 204 to reduce or eliminate any wrinkles, creases, or deflections that may be present in the carpet 50 prior to contact with the second high speed abrasive drum 204. As the primary drum 100 rotates around its axis, the second high speed abrasive drum 204 spins and comes into contact with the carpet 50. The second high speed abrasive drum 204 applies a substantially constant pressure against the carpet 50 as it spins at a speed sufficient to effectively remove the face fibers 20 from the primary backing 30.

Figure 12:
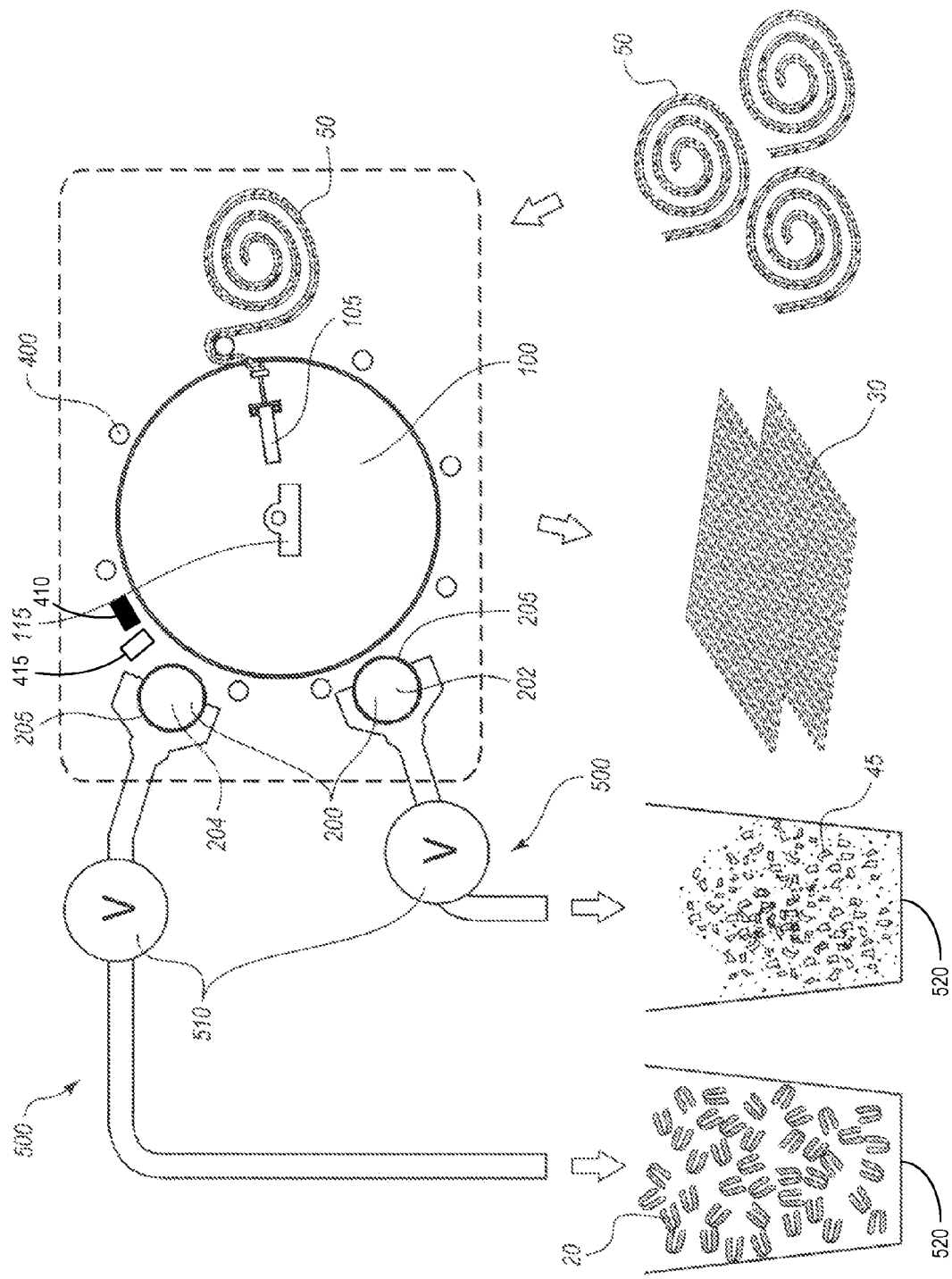
FIG. 12 is a schematic view of an embodiment of a carpet recycling system as described herein.

FIG. 12 provides a schematic illustration of an embodiment of a system suited to the methods for deconstructing and recycling carpet 50 as described herein. The system embodiment illustrated in FIG. 12 illustrates that the methods described herein are suited to the stepwise removal and recovery of the primary components of the carpet 50 being recycled. With reference to FIG. 12, with the carpet 50 secured at one end in the primary drum 100, the primary drum 100 is rotated such that the secondary backing 40 of a carpet 50 faces out and the carpet 50 is pulled under the one or more rollers 400, which work to maintain the carpet 50 in position against the primary drum 100 and under tension as the primary drum 100 rotates. As the carpet 50 passes the first high speed abrasive drum 202 fitted with an abrasive material 205, the secondary backing 40 is removed from the primary backing 30, resulting in an aggregate mixture 45 of secondary components (e.g., abraded secondary backing fiber 42, adhesive 70, and filler 60 materials). In certain embodiments described herein, the aggregate mixture 45 may be collected and separated into its secondary components by a collection system 500, which may include any combination of one or more vacuum systems 510, one or more filters, one or more cyclone systems, one or more vibratory screens, or any other physical or mechanical separation device.

In one embodiment, a vacuum system 510 may be used to collect the aggregate mixture 45 released from the abrasion, and a cyclone system may be used to transfer the aggregate mixture 45 to a vibratory screen. The vibratory screen may be used to separate the aggregate mixture 45 into its secondary component materials. Where a vacuum system 510 is used to collect the aggregate mixture 45 released from the abrasion, the vacuum system 510 may be configured to facilitate the mechanical separation of the secondary backing fiber 42 from adhesive 70 and filler 60 materials. For example, the conduit within which a vacuum is generated may include one or more drops, chutes, or openings (not shown) where larger-sized or heavier materials (such as, e.g., a collection of secondary backing fiber 42) can drop away and separate from lighter adhesive 70 and filler 60 materials, as they are pulled through the vacuum system to be collected (such as by a cyclone collection system). Alternatively or in addition, in certain embodiments, a vacuum system may include one or more filters sized and configured to separate the one or more secondary component materials included in the aggregate mixture 45. The vacuum system may include one or more of a filter, screen, sieve, mesh, or other suitable mechanism configured to capture and collect one or more of the secondary backing fibers 42 or the adhesive 70 and filler 60 materials. The vacuum systems 510 described herein may include a cyclone system configured to collect or further separate the aggregate mixture 45 collected by the vacuum system 510 and received into the cyclone system. In one embodiment, the vacuum systems 510 described herein or any other suitable mechanisms, such as a conveyor belt, may be used to transfer the one or more secondary component materials separated from the aggregate mixture 45 into one or more designated containers 520 for collection or further processing, as desired, for sale, transportation, or use.

In one embodiment, a vacuum system 510 may be used to collect the face fiber 20 released from abrasion, and a cyclone system may be used to transfer the face fiber 20 to a vibratory screen to remove any residual primary backing 30 or secondary backing components. The cyclone system described herein may also be used to transfer the face fibers 20 to a designated container 520 for collection or further processing, as desired, for sale, transportation, or use. Alternatively or in addition, in some embodiments, a cyclone system or another suitable system, such as a conveyor system, may be used to transport the face fibers 20 to a packing system to be densified, pelletized, and/or baled.

Where a vacuum system is used herein as part of a collection system, in order to generate the negative pressure within the vacuum system 510, an inline fan suitable for pulling the aggregate mixture 45 through the vacuum system 510 may be used. The inline fan can be positioned, as desired, within the vacuum system 510 to generate a negative pressure to pull the aggregate mixture 45 through the vacuum system 510. To increase system reliability and operational life of the inline fan, the inline fan can be positioned within the vacuum system 510 such that contact between the inline fan and primary or secondary component materials is prevented or minimized. In one embodiment, the inline fan is positioned within the vacuum system 510 such that one or all of the primary or secondary component materials is collected prior to reaching the inline fan.

Once the secondary backing 40 is removed, the face fiber 20 of the carpet 50 is then stripped by abrasion from the primary backing 30. In the embodiment of the system illustrated in FIG. 12, the carpet 50 is prepared for stripping of the face fibers 20 by turning the carpet 50 over so that the face fibers 20 face out. With the system shown in FIG. 12, turning the carpet 50 over can be accomplished by reversing the direction of rotation of the primary drum 100, resulting in the carpet 50 being pulled through the one or more rollers 400 such that the primary backing 30 is positioned against the primary drum 100 and the face fibers 20 are positioned to come into contact with the second high speed abrasive drum 204 fitted with an abrasive material 205. The second high speed abrasive drum 204 may be similar in construction and operation to the first high speed abrasive drum 202. As the primary drum 100 rotates in the direction opposite to that used for removal of the secondary backing 40, the face fibers 20 come into contact with the second high speed abrasive drum 204, resulting in the face fibers 20 being stripped from the primary backing 30. Again, a vacuum system 510 may be used to collect the separated face fibers 20 and a cyclone system may be used to transfer the separated face fibers 20 to a container 520 for collection or further processing, as desired, for sale, transportation, or use. Depending upon the final disposition of the face fibers 20, the face fibers 20 may be, for example, densified, pelletized, and/or baled.

Once the secondary backing 40 and the face fibers 20 are removed, the primary backing 30 is removed from the primary drum 100. At this point, the primary backing 30 is essentially free of secondary backing 40 and face fiber 20 materials. The primary backing 30 can then be collected by any suitable means and processed, as desired, for sale, transportation, or use. Depending upon the final disposition of the face fibers 20, the face fibers 20 may be, for example, densified, pelletized, and/or baled.

Though the system illustrated in FIG. 12 is just one embodiment of a system suited for recycling carpet 50 according to the present description, FIG. 12 highlights that the methods described herein not only break carpet 50 down into the materials forming the primary carpet components, but the methods described herein also allow for the collection of the materials forming each of the primary components as discrete products. The materials collected include little cross-contamination. For example, the face fibers 20 collected include little to no material from the secondary backing 40 or primary backing 30. Additionally, the recovered primary backing 30 material includes little to no face fiber 20 or secondary backing 40 material. Each of the discrete products produced by the methods and systems described herein can, itself, be sold, transported, and used with little to no additional processing.

Figure 13:
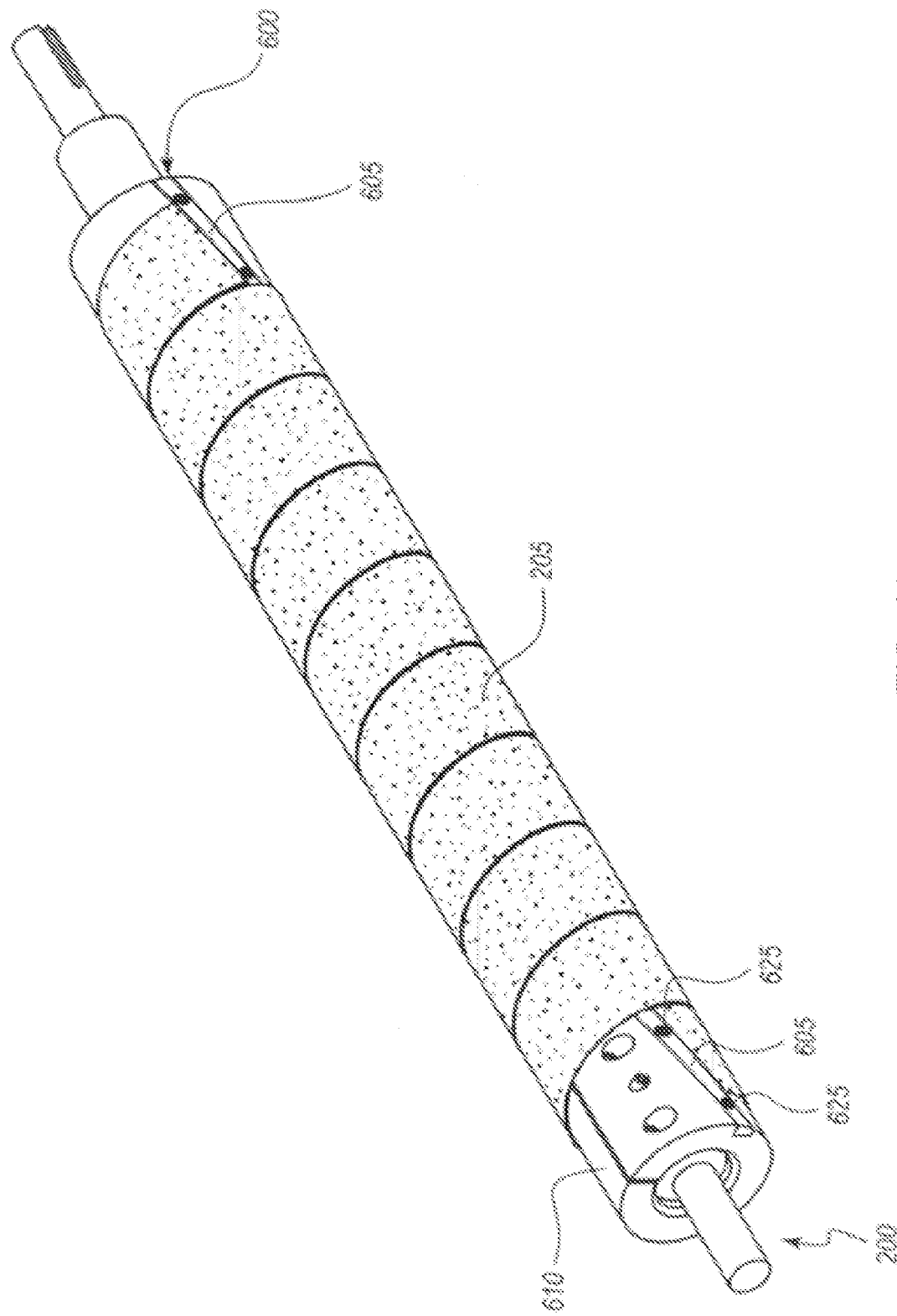
FIG. 13 is a perspective view of an embodiment of an assembled high speed abrasive drum 200 fitted with an abrasive material 205 that is spirally wrapped around the high speed abrasive drum 200.
Figure 14:
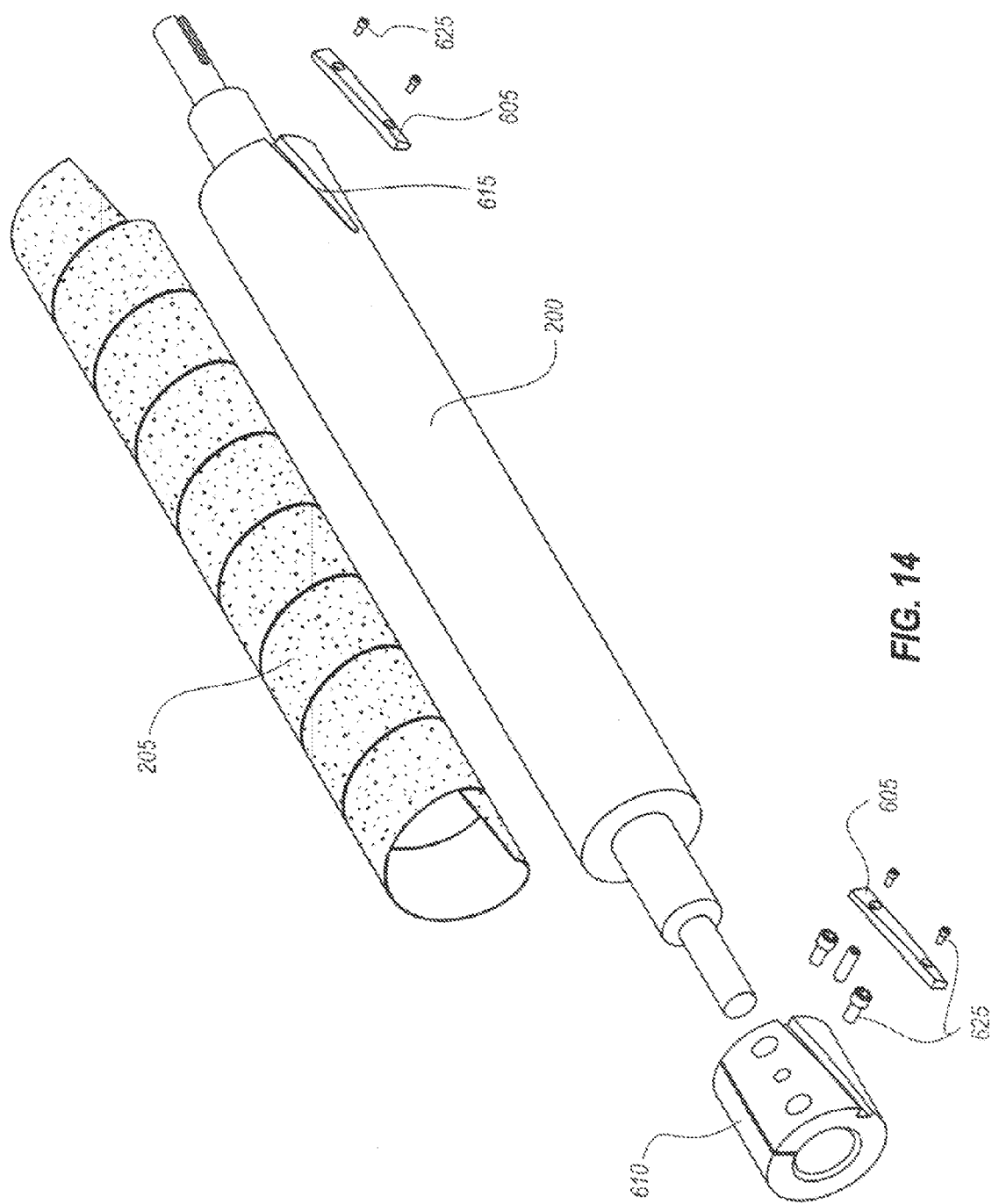
FIG. 14 is a perspective view of the high speed abrasive drum 200 from FIG. 13 prior to assembly.

FIGS. 13 and 14 illustrate a perspective view of an exemplary embodiment of a high speed abrasive drum 200 that can be used in the systems and methods described herein. The high speed abrasive drum 200 is configured for receiving and securing an abrasive material 205 onto a high speed abrasive drum 200. As illustrated in FIGS. 13 and 14, the high speed abrasive drum 200 may be configured such that it has an abrasive retainer 600 on the head end and an adjustable sleeve 610 on the tail end. The adjustable sleeve 610 may also be configured to have an abrasive retainer 600. The abrasive retainer 600 may include a retaining strip 605, a machined slot 615, and a fastening mechanism 625. Examples of such fastening mechanisms 625 may include screws, pins, and the like. The retaining strip 605 and fastening mechanism 625 may be inserted into the machined slot 615 located on the head end of the high speed abrasive drum 200 to secure one end of the abrasive material 205 in place. The abrasive material 205 may be wrapped around the high speed abrasive drum 200 toward the tail end. The loose end of the abrasive material 205 may be secured to the tail end of the high speed abrasive drum 200 by inserting the retaining strip 605 and fastening mechanism 625 into the machined slot 615 of the adjustable sleeve 610. The adjustable sleeve 610 may be fitted and secured over the tail end of the high speed abrasive drum 200 using a fastening mechanism 625.

Figure 15:
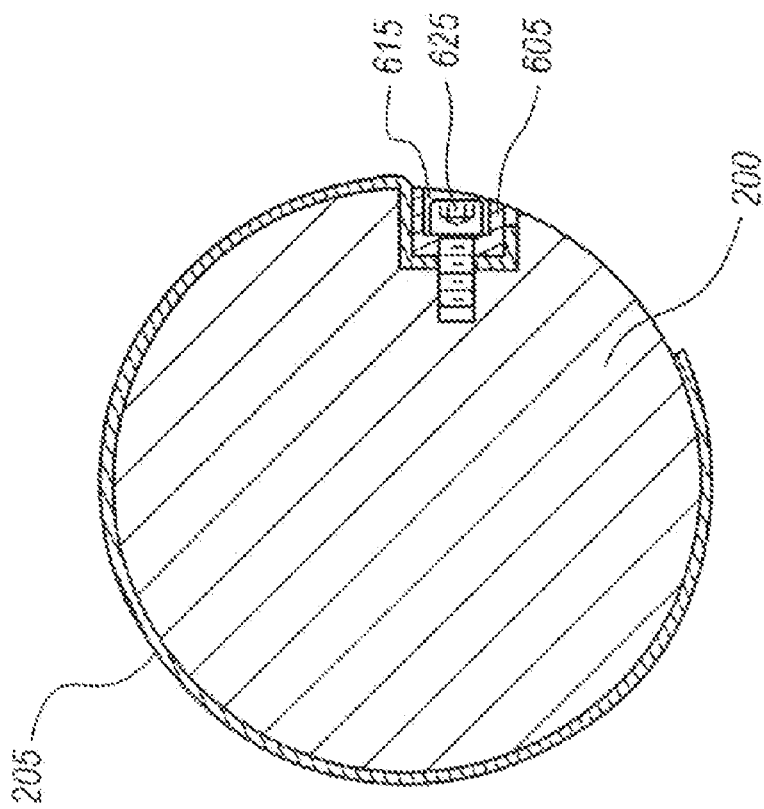
FIG. 15 is cross sectional view of the head end of an embodiment of a high speed abrasive drum 200.

FIG. 15 illustrates a cross-sectional view of the head end of a high speed abrasive drum 200. Shown in FIG. 15 is a high speed abrasive drum 200, a retaining strip 605, a fastening mechanism 625, and an abrasive material 205. The retaining strip 605 and fastening mechanism 625 secure an edge of the abrasive material 205 in the machined slot 615 of the high speed abrasive drum 200. The length of the abrasive material 205 may be wrapped around the high speed abrasive drum 200 toward the tail end.

Figure 16:
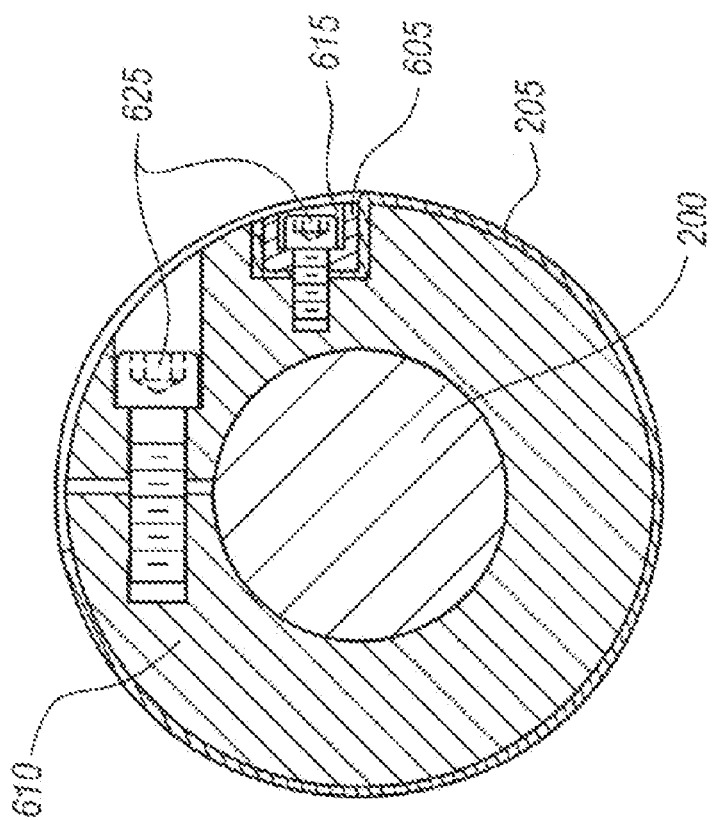
FIG. 16 is a cross sectional view of the tail end of an embodiment of a high speed abrasive drum 200.

FIG. 16 illustrates a cross-sectional view of the tail end of a high speed abrasive drum 200. Shown in FIG. 16 is a high speed abrasive drum 200, an adjustable sleeve 610, a retaining strip 605, an abrasive material 205, and fastening mechanisms 625. The clamp strip 605 and a fastening mechanism 625 secure an edge of the abrasive material 205 in the machined slot 615 of the adjustable sleeve 610. The adjustable sleeve 610 may also be attached to the high speed abrasive drum 200 using a fastening mechanism 625.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

The materials recovered using the methods, systems, and devices described herein can be used for any purpose suited to the material recovered. Because the methods described herein facilitate the removal and isolation of individual components of the carpet 50 being recycled, the methods reduce the amount of additional processing required to prepare the materials for commercial sale and use as recycled materials for any one of a variety of applications. In some embodiments, where the primary components used to construct the carpet 50 are fabricated from synthetic yarns or fibers that exhibit lipophilic properties, the materials generated from the methods and systems described herein are well suited for use in the recovery, clean-up, and recycling of liquid hydrocarbons and organic liquids. Examples of suitable fibers exhibiting lipophilic properties suitable for recovery, clean-up, and recycling of liquid hydrocarbons and organic liquids include synthetic fibers, such as polymer fibers. These polymer fibers may be formed from one or more of nylon, polyester, olefin, or acrylic polymers.

With reference, for example, to FIG. 12, where any of the primary backing 30, the secondary backing 40, or the face fibers 20 are formed of a lipophilic material, the recovered lipophilic material may be used to form absorbent booms, bales, mats, pads, or filling suited for the recovery, clean-up, and recycling of liquid hydrocarbons and organic liquids. In most carpets 50 manufactured, at least one of the primary components is formed using a synthetic yarn or fiber. For example, the yarns used in forming the secondary 40 and primary 30 backings are often made of polypropylene (an olefin polymer). Additionally, the face fiber 20 material is typically one of polypropylene, nylon-6, nylon-6.6, polyethylene terephthalate (PET), polytrimethyl terephthalate (PTT), acrylic fibers, and the like. In one example, because the primary backing 30 recovered using the systems and methods described herein is often preserved substantially intact, the recovered primary backing 30 may be sewn or otherwise formed into the exterior netting of a mat, pad, bale, or boom, with the exterior netting formed by the recovered primary backing 30 material being filled with one or more of recovered face fiber 20, recovered secondary backing fiber 42, and recovered primary backing 30 fiber. In specific embodiments, such a mat, pad, bale, or boom would be configured to allow water to pass through while liquid hydrocarbon or liquid organic material contained in the water is collected in the matrix formed by the recovered lipophilic fiber material. Examples of mats, pads, bales, and booms that may be constructed using the materials recovered from the methods and systems described herein are shown, for instance, in U.S. Pat. Nos. 3,565,257, 3,667,608, 3,679,058, 3,968,041, 5,165,821, 5,580,185, 5,679,247, 6,143,172, and 6,743,367, the entire contents of which are herein incorporated by reference.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

The invention claimed is:

1. A method for carpet recycling, the method comprising:
obtaining a carpet, wherein the carpet comprises at least one secondary backing and at least one face fiber;
removing the at least one secondary backing of the carpet with abrasion; and
removing the at least one face fiber of the carpet with abrasion.

2. The method of claim 1, wherein the method further comprises holding the carpet in tension.

3. The method of claim 2, wherein the carpet is held in tension along the outer radius of a primary drum.

4. The method of claim 3, wherein the carpet is held in tension by a force, and wherein the force applied is selected from one of the following ranges: 150 to 1,500 pounds per square inch; 250 to 1,500 pounds per square inch; 250 to 1,250 pounds per square inch; 250 to 1,000 pounds per square inch; 500 to 1,500 pounds per square inch; 500 to 1,250 pounds per square inch; 500 to 1,000 pounds per square inch; 750 to 1,500 pounds per square inch; 750 to 1,250 pounds per square inch; and 750 to 1,000 pounds per square inch.

5. The method of claim 4, wherein the primary drum rotates at a speed selected from one of the following ranges: 1 to 100 feet per minute; 2-50 feet per minute; 2-30 feet per minute; 2-20 feet per minute; 2-15 feet per minute; 2-10 feet per minute; 2-5 feet per minute; 15-75 feet per minute; 15-65 feet per minute; 15-55 feet per minute; 15-45 feet per minute; 15-35 feet per minute; 15-25 feet per minute; 18-60 feet per minute; 25-100 feet per minute; 25-75 feet per minute; 25-65 feet per minute; 25-55 feet per minute; 25-45 feet per minute; and 25-35 feet per minute.

6. The method of claim 2, wherein removing the at least one secondary backing or the at least one face fiber of the carpet with abrasion comprises applying at least one high speed abrasive drum against the carpet.

7. The method of claim 6, wherein the at least one high speed abrasive drum operates at a speed selected from one of the following ranges: 500-RPM to 10,000-RPM; 500-RPM to 7,500-RPM; 500-RPM to 5,000-RPM; 500-RPM to 3,500-RPM; 500-RPM to 2,500-RPM; 750-RPM to 7,500-RPM; 750-RPM to 5,000-RPM; 750-RPM to 3,500-RPM; 750-RPM to 2,500-RPM; 1,000-RPM to 7,500-RPM; 1,000-RPM to 5,000-RPM; 1,000-RPM to 3,500-RPM; and 1000-RPM to 2,500-RPM.

8. The method of claim 6, wherein the at least one high speed abrasive drum applies a force of approximately 4 to 6 pounds per inch of carpet width against the carpet.

* * * * *